United States Patent
Wallentin et al.

(10) Patent No.: US 11,140,617 B2
(45) Date of Patent: Oct. 5, 2021

(54) METHOD FOR ACCESS BARRING

(71) Applicant: Telefonaktiebolaget LM Ericsson (publ), Stockholm (SE)

(72) Inventors: Pontus Wallentin, Linköping (SE); Jens Bergqvist, Linköping (SE); Christofer Lindheimer, Vadstena (SE); Ivo Sedlacek, Hovorcovice (CZ)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 31 days.

(21) Appl. No.: 16/621,836

(22) PCT Filed: Jun. 6, 2018

(86) PCT No.: PCT/IB2018/054060
§ 371 (c)(1),
(2) Date: Dec. 12, 2019

(87) PCT Pub. No.: WO2018/229602
PCT Pub. Date: Dec. 20, 2018

(65) Prior Publication Data
US 2020/0178162 A1    Jun. 4, 2020

Related U.S. Application Data

(60) Provisional application No. 62/520,747, filed on Jun. 16, 2017.

(51) Int. Cl.
*H04W 48/16* (2009.01)
*H04W 48/02* (2009.01)
(Continued)

(52) U.S. Cl.
CPC .......... *H04W 48/16* (2013.01); *H04W 48/02* (2013.01); *H04W 48/08* (2013.01); *H04W 48/18* (2013.01)

(58) Field of Classification Search
None
See application file for complete search history.

(56) References Cited

U.S. PATENT DOCUMENTS

| 9,565,550 B2* | 2/2017 | Klatt ................... H04W 8/183 |
| 10,034,197 B2* | 7/2018 | Hwang ................ H04W 72/10 |
| 2018/0199263 A1* | 7/2018 | Huang-Fu ............ H04W 48/06 |

FOREIGN PATENT DOCUMENTS

| WO | 2012 013355 A1 | 2/2012 |
| WO | 2014 010919 A1 | 1/2014 |
| WO | 2015 104118 A1 | 7/2015 |

OTHER PUBLICATIONS

PCT Notification of Transmittal of the International Search Report and the Written Opinion of the International Searching Authority, or the Declaration for International application No. PCT/IB2018/054060—dated Sep. 11, 2018.

(Continued)

*Primary Examiner* — Hong S Cho
(74) *Attorney, Agent, or Firm* — Baker Botts, LLP

(57) ABSTRACT

A method in a user equipment (UE) (110) is disclosed. The method comprises obtaining (1301) a primary barring configuration (906) for access control in a wireless communications network. The method comprises obtaining (1302) a secondary barring configuration (912) for access control in the wireless communications network. The method comprises determining (1303), based on the primary barring configuration and the secondary barring configuration, whether an access attempt by the UE in the wireless communications network is barred.

24 Claims, 22 Drawing Sheets

(51) Int. Cl.
    *H04W 48/08* (2009.01)
    *H04W 48/18* (2009.01)

(56) References Cited

OTHER PUBLICATIONS

3GPP TSG-RAN WG2 #97; Athens, Greece; Source: Ericsson; Title: Access Control for NR (Tdoc R2-1700911)—Feb. 13-17, 2017.

* cited by examiner

```
SystemInformationBlockType2-902 ::=    SEQUENCE { unifiedBarringConfig-904               SEQUENCE {
    primaryBarringConfig-906                   PrimaryBarringConfig,
    secondaryBarringConfigList-912             SecondaryBarringConfigList
        OPTIONAL -- Need OP
}

PrimaryBarringConfig ::=               SEQUENCE {
    primaryBarringFactor-908                   ENUMERATED {
                                                   p00, p05, p10, p15, p20, p25, p30, p40,
                                                   p50, p60, p70, p75, p80, p85, p90, p95},
    primaryBarringTime-910                     ENUMERATED {s4, s8, s16, s32, s64, s128, s256, s512}
}

SecondaryBarringConfigList ::= SEQUENCE (SIZE (0..maxAccessCat)) OF BarringPerAccessCategory-914

BarringPerAccessCategory-914 ::= SEQUENCE {
    accessCategory-916                         INTEGER (0..maxAccessCat),
    secondaryBarringConfig-918                 SEQUENCE {
        secondaryBarringFactor-920
        secondaryBarringTime-922                   SecondaryBarringFactor-920,
                                                   SecondaryBarringTime-922 OPTIONAL -- Need OP
    }    OPTIONAL    -- Need OP
} maxAccessCat INTEGER ::= 63
```

FIGURE 10

```
SecondaryBarringFactor-920    ::= CHOICE {
    secondaryBarringFactor1         BOOLEAN,
    secondaryBarringFactor2         ENUMERATED {p-30, p-20, p-10, p+10, p+20, p+30},
    secondaryBarringFactor3         ENUMERATED {o-16, o-6, o-4, o-2, o+2, o+4, o+6, o+16}
}

SecondaryBarringTime-922      ::= CHOICE {
    secondaryBarringTime1           BOOLEAN,
    secondaryBarringTime2           ENUMERATED {s-128, s-32, s+32, s+128},
    secondaryBarringTime3           ENUMERATED {o-2, o-1, o+1, o+2}
}
```

FIGURE 11

```
SystemInformationBlockType2 ::=      SEQUENCE {
    unifiedBarringConfig             SEQUENCE {
        primaryBarringConfigList         PrimaryBarringConfigList,
        secondaryBarringConfigList       SecondaryBarringConfigList
    }   OPTIONAL -- Need OP
}

PrimaryBarringConfigList ::= SEQUENCE (SIZE (0..7)) OF PrimaryBarringPerCategory PrimaryBarringPerCategory ::=    SEQUENCE {
    accessCategory                   INTEGER (0..7),
    primaryBarringFactor             ENUMERATED {
                                         p00, p05, p10, p15, p20, p25, p30, p40,
                                         p50, p60, p70, p75, p80, p85, p90, p95},
    primaryBarringTime               ENUMERATED {s4, s8, s16, s32, s64, s128, s256, s512}
}

SecondaryBarringConfigList ::= SEQUENCE (SIZE (8.. maxAccessCat)) OF BarringPerAccessCategory BarringPerAccessCategory ::=    SEQUENCE {
    accessCategory                  INTEGER (8..maxAccessCat),
    secondaryBarringConfig          SEQUENCE {
        secondaryBarringFactor,
        secondaryBarringTime            SecondaryBarringFactor,
                                        SecondaryBarringTime         OPTIONAL -- Need OP
    }   OPTIONAL    -- Need OP
}
```

FIGURE 12

METHOD FOR ACCESS BARRING

This nonprovisional application is a U.S. National Stage Filing under 35 U.S.C. § 371 of International Patent Application Serial No. PCT/IB2018/054060 filed Jun. 6, 2018 and entitled "Method for Access Barring", which claims priority to U.S. Provisional Application No. 62/520,747, filed Jun. 16, 2017 both of which are hereby incorporated by reference in their entirety.

TECHNICAL FIELD

The present disclosure relates, in general, to wireless communications and, more particularly, to methods for access barring.

BACKGROUND

When performing access to a wireless communication system, a user equipment (UE) must signal to the network that it wants to acquire communication opportunities. There are many schemes for how this can be done. As one example, a UE can utilize air-interface resources (e.g., times, frequencies) to send a short message that would indicate to the network that the UE wants to communicate. Further details about a certain communication need can then occur in subsequent communication.

The event that triggers a UE to perform a request to access a wireless communication system may, for example, be a need for an application, such as a software module in the UE, to transmit uplink (UL) user data, and/or receive downlink (DL) user data. Or, a need to exchange signaling messages with a network node. Or alternatively, a combination of both.

FIG. 1 illustrates an example of a simplified wireless network 100. Wireless network 100 includes a UE 110, which communicates with a network node 160 (e.g., an access node), which in turn is connected to a core network node 105. For wireless communication systems pursuant to the 3rd Generation Partnership Project (3GPP) Evolved UMTS Terrestrial Radio Access Network (E-UTRAN)/Long Term Evolution (LTE) standard specifications, network node 160 typically corresponds to an Evolved NodeB (eNB) and core network node 105 typically corresponds to either a Mobility Management Entity (MME) and/or a Serving Gateway (SGW).

FIG. 2 is a signal flow diagram illustrating an example of random access and radio resource control connection establishment in 3GPP LTE. In 3GPP LTE, a request for communication is performed by initiating a random access procedure followed by a radio resource control (RRC) Connection Establishment procedure. As shown in the example of FIG. 2, this sequence starts at step 201 where UE 110 transmits a random access preamble (also known as "msg1") to network node 160 (e.g., a base station (BS), eNB, gNB, access point, wireless device, etc.) on specifically allocated channels or resources. When network node 160 receives the random access preamble, network node 160 sends a random access response (also known as "msg2"). The random access response includes an allocation of resources for continued signaling, in this case the RRC Connection Request (also known as "msg3") sent by UE 110 to network node 160 at step 203. The RRC Connection Request is the first message in the RRC Connection Establishment procedure. In response to the RRC Connection Request message, at step 204 network node 160 sends an RRC Connection Setup message to UE 110. At step 205, UE 110 sends an RRC Connection Setup Complete message to network node 160.

An access attempt will cost air interface resources. For example, both the initial random access preamble message (shown at step 201 in FIG. 2) as well as resources for further signalling (exchanged in steps 202 through 205 in FIG. 2) will add to the wireless network load, simply to configure and set up communication resources for subsequent data transfer. Notably, even further communication is needed with network entities before any communication can take place (not explicitly shown in FIG. 2).

Under certain circumstances, it is desirable to prevent UE's from making these access attempts. For example, in case of an overload situation (e.g., radio resource congestion or shortage of processing capabilities), a network may wish to reduce overload by denying access to a cell. In some cases, the network may also need to prioritize between specific users and/or services during overload situations (e.g., to give priority to emergency calls compared to ordinary calls).

To this end, the network may employ what is in 3GPP referred to as access control. Access Class Barring (ACB) is an example of one such control technique. In short, access barring relates to preventing (or making it less likely) that a UE will attempt to send an access request (e.g., to initiate the sequence illustrated in FIG. 2 above by sending a preamble see step 201)). In this way, the total load in the system can be controlled. For example, the network may divide UEs (or different reasons for why a UE wants access) into different classes, or categories, and dependent on this, the network can differentiate and make it less likely that, for example, certain UEs and/or certain events trigger access requests. As one example, a given UE may belong to a certain access class. In such a scenario, the network may communicate, via broadcasted system information, that certain classes at certain instances are barred (i.e., not allowed to make access), or allowed to make access with a lower probability if not barred altogether. When a UE receives this broadcasted system information, if it belongs to a barred access class, it may result in a UE not sending an access request.

There are multiple variants of access barring mechanisms specified for LTE. A first example is Access Class Barring as per 3GPP Rel-8. In this mechanism, it is possible to bar all access requests from a UE. Normal UEs in Access Class (AC) range 0-9 are barred with a probability factor, also referred to as barring factor and a timer, also referred to as barring duration, whereas specific classes can be controlled separately. Beside the normal classes 0-9, additional classes have been specified to control the access to other type of users (e.g., emergency services, public utilities, security services, etc.).

A second example is Service Specific Access Control (SSAC). The SSAC mechanism allows a network to prohibit Multi-Media Telephony (MMTel)-voice and MMTel-video accesses from a UE. The network broadcasts barring parameters (parameters similar to ACB) and a barring algorithm that is similar to ACB (barring factor and random timer). An actual decision as to whether access is allowed is done in the IP Multi-Media Subsystem (IMS) layer of a UE.

A third example is access control for Circuit-Switched FallBack (CSFB). The CSFB mechanism allows a network to prohibit CSFB users. A barring algorithm used in this case is similar to ACB.

A fourth example is Extended Access Barring (EAB). The EAB mechanism allows a network to prohibit low priority UEs. Barring is based on a bitmap in which each access class (e.g., AC 0-9) can be either barred or allowed.

A fifth example is access class barring bypass. The ACB mechanism allows for omitting access class barring for IMS voice and video users.

A sixth example is Application specific Congestion control for Data Communication (ACDC) barring. ACDC allows barring of traffic from/to a certain application. In this approach, applications are categorized based on global application identification (ID) (e.g., in Android or iOS). The network broadcasts barring parameters (barring factor and timer) for each category.

In LTE, before a UE performs access towards a network node (e.g., an access node), it needs to read certain system information that is usually broadcast by the network node (e.g., network node 160 described above in relation to FIGS. 1 and 2). The system information describes how access should be performed to initiate communication between a UE (e.g., UE 110 described above in relation to FIGS. 1 and 2) and the network node. Part of this system information may be information related to access barring. This barring information is usually broadcasted in the access network and there can be different barring information in different cells or areas. Usually, one network node will transmit its own barring information. The barring information may be arranged in a way such that it includes a set of access categories [1 . . . m] and for each category, information elements containing a barring factor and a barring time, for example as specified in 3GPP TS 36.331 v.14.1.0, 2016-12. An example of ACDC barring information is given below:

```
    BarringPerACDC-Category-r13 ::=SEQUENCE {
        acdc-Category-r13           INTEGER (1..maxACDC-Cat-r13),
        acdc-BarringConfig-r13      SEQUENCE {
            ac-BarringFactor-r13    ENUMERATED {
                                      p00, p05, p10, p15, p20, p25, p30,
p40,
                                      p50, p60, p70, p75, p80, p85, p90,
p95},
            ac-BarringTime-r13      ENUMERATED {s4, s8, s16, s32,
s64, s128, s256, s512}
        }                           OPTIONAL   -- Need OP
    }
```

This barring information per access category will be used by the UE attempting access. It is a way for the network node to limit and prioritize certain accesses over other.

An ongoing evolution of these different access control mechanisms, in particular for 5th Generation (5G) cellular standards according to 3GPP, is to gather them into one single mechanism that can be configurable and adaptable to various network operator preferences. This is hereinafter referred to as unified access control (UAC). With UAC, there is a single set of access categories (similar to classes). At least some access categories should be possible to configure, such that, for example, access category X is used for certain pre-determined accesses. Access category X can relate to, for example, which core network a certain UE is aiming to access and/or what service triggers the access (e.g., SMS, MMTel or other services). Other aspects can also be included when determining access category. As an example, an access category (UBMCat) determination can be dependent on a number of aspects, such as:

UBMCat= f(..., AccessClass=nn, CN=NG, EstablishmentCause=mo, Service=ServiceID, DeviceType=MTC, callPriority=Low, ApplicationID=yy..., Slice ID=NN, PLMN ID=pp, ... ), where: "Access Class" could denote the old access class as described above; "CN" is a core network type; "EstablishmentCause" is one of several establishment causes as described further below; "Service" equals Service ID; "Device Type" can be, for example, a Machine-Type Communication (MTC) device; and a general priority for application ID yy could be considered low when accessing slice ID NN on PLMN ID pp.

All or any subset of these (as well as other) aspects may be considered when determining access category. This provides a flexible way to make a future-proof framework for access category and access barring.

FIG. 3 is a signalling diagram illustrating an example procedure for unified access control. FIG. 3 illustrates signalling between a UE 110, a network node 160, and a core network node 105. Before an access is attempted by UE 110, UE 110 needs to associate an event, such as a trigger from higher layers in UE 110 to send a signalling message, to an access category of the [1 . . . m] access categories. To do this, UE 110 may be provided with instructions or rules from the network. FIG. 3 illustrates a signalling diagram for one exemplary procedure.

At step 302, a network node provides rules for which access category to use, based on considerations that relate to higher layers. In the example of FIG. 3, this information is illustrated as originating from core network node 105 but may very well also originate from other network nodes and be transmitted to UE 110 via core network node 105 or possibly via another node (e.g., an operator's policy functionality configuring UE 110 via WLAN access network). If the network includes a higher-level controller or policy functionality, it may originate from another node hosting such controller or policy functionality. The higher layer rules may be signalled to UE 110 via Non-Access-Stratum (NAS) signalling, or it may be signalled using other protocols. For example, UE 110 may include an entity that can be configured with and host access category rules signalled using an Open Mobile Alliance Device Management (OMA-DM) device management protocol.

Included in the rules from core network node 105 could be information related to, for example, how UE 110 should select an access category if the access is triggered by a certain service. Examples of such services can be, for example, an emergency service or an MMTel Service. Further, the rules can include information related to how UE 110 should select access category if an access is triggered by a certain application, such as, for example, a certain game or a certain social media application. Rules can also include information related to access to various slices. For example, if UE 110 is a small device-UE, UE 110 may want to access, for example, an Internet-of-Things (IoT)-optimized slice. Further, it is not uncommon that radio networks are shared between different operators or that one and the same operator is using different Public Land Mobile Network (PLMN) codes. There could be different rules for selecting access category dependent on if access is to occur for different PLMN's.

It should be noted that step 302 may also include signalling from network node 160, in particular when it comes to access category selection for accesses that are triggered by, for example, signalling with network node 160.

At step 304, an event occurs triggering a need for UE 110 to request an access to the network, such as a need to transmit UL data when UE 110 is in idle mode. At step 306, UE 110 determines the access category, for example based on the available rules including those that were obtained in step 302 After determining the access category for this particular access, at step 308 UE 110 reads access barring indications (typically part of the broadcasted system information). Typically, UE 110 is required to maintain the latest version of the broadcasted system information, which implies that UE 110 in many cases does not actually have to re-read the system information and instead can use cached system information. At step 310, UE 110 performs a barring check using the determined access category and the access barring indication as input. If the barring check results in that the access was "barred," UE 110 will not perform an access and will instead wait for a period of time, such as a time period indicated in the access barring indication. If the barring check results in that the access was "not barred," UE 110 can proceed with the random access and RRC connection establishment procedure, as shown in FIG. 3 at step 312.

The development of a UAC mechanism for access barring is currently ongoing. For example, in case the UE does not have any valid configured rules to determine access categories (e.g., such as those that were to be provided in step 302 of FIG. 3 described above), it has been proposed that the UE will use default access categories. The rules to determine the default access category to use in this case may be standardised.

The access control and in particular the barring mechanisms are used to prevent UE's from sending an access request. There are also other mechanisms available for controlling the load in the network. For example, in situations when access barring allows an access attempt and a UE is allowed to send a random access preamble and an RRC Connection Request (or any equivalent message, hereinafter referred to as "msg3"), the network may respond with an RRC Connection Reject message. The reasons for this reject message can be, for example, an overload situation that is not yet reflected in the parameters governing the access barring (other reasons are possible).

Before an RRC Connection Reject or an RRC Connection Setup or equivalent response message is sent to the UE (or before a msg3 leads to allocation of further resources, for example, for subsequent signalling), the network side typically evaluates the reason for why the access request was sent. In msg3, the UE indicates an "establishment cause" to reflect the reason for why the access request was sent. In E-UTRAN/LTE, this is a 3-bit field that can take the values: Emergency, High Priority Access, mt-Access, mo-Signalling, mo-Data, delayTolerantAccess-v1020, mo-VoiceCall-v1280, spare. There is also a standard applicable for narrowband LTE and for this, the establishment cause field is slightly different.

The establishment cause value sent in msg3 originates from higher layers in the UE. NAS is the term for the layers above the access layers. Lower layers, or access layers in the UE receive the establishment cause together with a call type indication for each event that should trigger an access request. The call type typically is an indication that controls the access barring in the UE RRC layer of an E-UTRAN/LTE capable UE, according to the old access classes as described above, and indicates how the UE should perform the evaluation of access barring. Different call types include: "originating signalling"; "emergency calls"; "originating MMTEL voice"; "originating MMTEL video"; "originating SMSoIP"; "originating SMS"; "terminating calls"; "originating calls"; and "mobile originating CS fallback".

Call type, establishment cause and type of trigger (e.g., what type of NAS message or event triggers a request to lower layers for transmitting an access request to the network) in combination with access class and barring parameters define how lower layers shall behave, both with respect to barring and what to include in a subsequent msg3 as the establishment cause.

FIG. 4 illustrates the planes in a communication system. A communication system, such as a 3GPP system, is normally functionally divided vertically into user plane 401, control plane 402, and management plane 403 as illustrated in FIG. 4. This division allows independent scalability, evolution and flexible deployments. User plane 401, which carries the user data traffic, contains functions and protocols related to user data transfer such as segmentation, reassembly, retransmission, multiplexing, ciphering, and so forth. In control plane 402, which carries signalling traffic, are the protocols and functions needed to setup, release, control and configure user plane 401. Control plane 402 also contains functions and protocols related to, for example, UE mobility, UE authentication, control of user sessions and bearers (also known as service data flows or QoS flows). Management plane 403, which carries administrative traffic, includes, for example, operations and maintenance (O&M) and provisioning functions. Normally, no distinct division exists between control plane 402 and management plane 403, but typically control plane 402 operates in a faster time scale (e.g., seconds) than management plane 403 (e.g., hours). User plane 401 typically operates in the fastest time scale (e.g., milliseconds).

FIG. 5 illustrates division of the 3GPP system into domains and strata. There are a number of domains, including UE 110, access network 502, and core network 503. Typically, UE 110, access network 502, and core network 503 all contain user plane, control plane, and management plane functions (such as those of user plane 401, control plane 402, and management plane 403 described above in relation to FIG. 4).

UE 110 is a device allowing a user access to network services. UE 110 may, for example, be a wireless terminal, such as a smart phone, equipped with a User Services Identity Module (U.S.S.). The latter contains the credentials to unambiguously and securely identify itself. The functions of the U.S.S. May be embedded in a standalone smart card, but could also be realized, for example, as software in a software module.

Access network 502 (also known as the Radio Access Network (RAN)) contains network nodes (e.g., base stations, eNBs, gabs) that manage the radio resources of access network 502 and provide UE 110 with a mechanism to access core network 503. Access network 502 is dependent of the radio access technology (RAT) used in the wireless interface between UE 110 and access network 502. Thus, we have different flavors of access network 502 for different RATS, such as E-UTRAN supporting LTE or E-UTRA RAT and NG-RAN supporting New Radio (or 5G) type of RAT.

Core network 503 consists of network nodes which provide support for the network features and telecommunication services, such as the management of user location information, control of network features and services, and the switching and transmission of signalling and user data. Core network 503 also provides the interface towards external network 507. There are different types of core networks 503, for different 3GPP system generations. For example, in 4G, also known as the Evolved Packet System (EPS), there is the Evolved Packet Core (EPC). As another example, the 5G Core (5GC) was developed as part of the 5G System (5GS).

Moreover, core network 503 is access-agnostic, and the interface between access network 502 and core network 503 enables integration of different 3GPP and non-3GPP access types. For example, an access network 502 (also known as E-UTRAN) supporting LTE or E-UTRA RAT as well as an access network (also known as NG-RAN) supporting New Radio type of RAT can both be connected to a 5G type of core network 503 (also known as 5GC).

External network 507 represents here a network outside of the 3GPP domain, such as the public Internet.

As seen in FIG. 5, the 3GPP system is also horizontally divided into Access Stratum (AS) 504 and NAS 505 reflecting a protocol layering hierarchy. In AS 504 are functions that are related to the wireless portion of the system, such as transport of data over the wireless connection and managing radio resources. AS 504 typically contains functions in access network 502 and the dialogue (using corresponding protocols) between UE 110 and access network 502. In NAS 505, which can be seen as higher in the protocol layering hierarchy than AS 504, are the functions that are not directly dependent on the RAT and, typically, the functions in core network 503 and the dialogue (using corresponding protocols) between UE 110 and core network 503.

In FIG. 5, application 506 is illustrated above NAS 505. Application 506 may contain parts in UE 110, core network 503, and external network 507.

FIG. 6 illustrates protocol layers in the user plane and control plane of a 3GPP system. The control plane (e.g., control plane 402 described above in relation to FIG. 4) and user plane (e.g., user plane 401 described above in relation to FIG. 4) of the AS (e.g., AS 504 described above in relation to FIG. 5) and NAS (e.g., NAS 505 described above in relation to FIG. 5) are further divided into protocol layers. As illustrated in FIG. 6, in AS 504 there is one protocol layer in control plane 402, namely the RRC layer 601. As RRC layer 601 is part of AS 504, it is dependent on the type of RAT used between UE 110 and access network 502. Thus, there are different flavours of RRC 601 for different RATs. For example, there is one type of RRC layer 601 for each of UTRA, E-UTRA and NR type of RATs.

Further, in AS 504 there are also a number of protocol layers in user plane 401, such as the Physical (PHY) layer 611, Medium Access Control (MAC) layer 612, Radio Link Control (RLC) layer 613, and Packet Data Convergence Control (PDCP) layer 614. For NR, it is expected that a new layer in AS 504 will be added, above PDCP 614 (denoted New Layer (NL) 615 in FIG. 6). All protocol layers, both in user plane 401 and control plane 402 of AS 504, are terminated in access network 502 in the network side (such as the eNB or the gNB).

In NAS 505, there are multiple protocol layers in control plane 402. In EPS (also known as 4G or LTE), these layers are known as EPS Mobility Management (EMM) 603 and EPS Session Management (ESM) 604. In the 5G system are protocol layers performing the equivalent functions of EMM 603 and ESM 604, such as Connection Management (CM) 605. Further, in NAS 505, there are multiple protocol layers in user plane 401, such as Internet Protocol (IP) 616.

Application 506 resides above NAS 505, and interacts with user plane 401 and, in some cases, also control plane 402.

There currently exist certain challenges with respect to access barring in 5G and future communication systems. There is a need for an access barring mechanism that allows for barring on individual access category basis, and still uses a reasonable amount of signalling and timers in the UE.

SUMMARY

To address the foregoing problems with existing solutions, disclosed is a method in a user equipment (UE). The method comprises obtaining a primary barring configuration for access control in a wireless communications network. The method comprises obtaining a secondary barring configuration for access control in the wireless communications network. The method comprises determining, based on the primary barring configuration and the secondary barring configuration, whether an access attempt by the UE in the wireless communications network is barred.

In certain embodiments, the method may comprise determining an access category associated with the access attempt by the UE. In certain embodiments, the secondary barring configuration may be associated with the determined access category.

In certain embodiments, the method may comprise in response to a determination that the access attempt by the UE in the wireless communications network is barred, refraining from performing the access attempt. In certain embodiments, the method may comprise in response to a determination that the access attempt by the UE in the wireless communications network is not barred, performing the access attempt.

In certain embodiments, the primary barring configuration may comprise a primary barring factor and a primary barring time.

In certain embodiments, the secondary barring configuration may comprise a secondary barring factor. In certain embodiments, the primary barring factor may comprise a percentage value representing a probability that the access attempt by the UE will not be barred and the secondary barring factor may comprise an indication of whether the primary barring factor should be applied. Determining whether the access attempt by the UE in the wireless communications network is barred may comprise determining whether the secondary barring factor indicates that the primary barring factor should be applied. In certain embodiments, the method may comprise in response to determining that the secondary barring factor indicates that the primary barring factor should not be applied, determining that the access attempt by the UE is not barred. In certain embodiments, the method may comprise in response to determining that the secondary barring factor indicates that the primary barring factor should be applied: generating a random number; and comparing the generated random number to the percentage value representing the probability that the access attempt by the UE will not be barred. In certain embodiments, the method may comprise determining that the access attempt is not barred when the random number is less than the percentage value representing the probability that the access attempt by the UE will not be barred. In certain embodiments, the method may comprise determining that the access attempt is barred when the random number is equal to or greater than the percentage value representing the probability that the access attempt by the UE will not be barred. In certain embodiments, the method may comprise waiting for a time period equal to the primary barring time before determining whether a subsequent access attempt by the UE in the wireless communications network is barred.

In certain embodiments, the secondary barring configuration may comprise a secondary barring time. In certain embodiments, the secondary barring time may comprise an indication of whether the primary barring time should be applied. In certain embodiments, the method may comprise if the secondary barring time indicates that the primary barring time should be applied, waiting for a time period equal to the primary barring time before determining whether a subsequent access attempt by the UE in the wireless communications network is barred.

In certain embodiments, the primary barring factor may comprise a percentage value representing a probability that the access attempt by the UE will not be barred, the secondary barring factor may comprise a percentage offset, and the method may comprise combining the percentage value representing the probability that the access attempt by the UE will not be barred with the percentage offset to obtain a combined barring factor, wherein determining whether the access attempt by the UE in the wireless communications network is barred is based on the combined barring factor. In certain embodiments, the primary barring factor may indicate a first position within a set, each position within the set associated with a percentage value representing a probability that the access attempt by the UE will not be barred, the secondary barring factor may comprise a position offset, and the method may comprise applying the position offset to the first position to obtain a combined barring factor, wherein determining whether the access attempt by the UE in the wireless communications network is barred is based on the combined barring factor. In certain embodiments, determining whether the access attempt by the UE in the wireless communications network is barred may comprise generating a random number and comparing the generated random number to the combined barring factor. In certain embodiments, the method may comprise determining that the access attempt is not barred when the random number is less than the combined barring factor. In certain embodiments, the method may comprise determining that the access attempt is barred when the random number is equal to or greater than the combined barring factor. In certain embodiments, the secondary barring configuration may comprise a secondary barring time, and the method may further comprise: combining the secondary barring time with the primary barring time to generate a combined barring time; and waiting for a time period equal to the combined barring time before determining whether a subsequent access attempt by the UE in the wireless communications network is barred.

In certain embodiments, obtaining the primary barring configuration may comprise obtaining a plurality of primary barring configurations for a set of access categories, each of the plurality of primary barring configurations associated with one or more access categories in the set of access categories. In certain embodiments, each of the plurality of primary barring configurations may be associated with a respective access category in the set of access categories. In certain embodiments, each of the plurality of primary barring configurations may be associated with multiple access categories in the set of access categories.

In certain embodiments, the primary barring configuration and the secondary barring configuration may be received via system information broadcast by a network node.

Also disclosed is a user equipment (UE). The UE comprises a receiver, a transmitter, and processing circuitry coupled to the receiver and the transmitter. The processing circuitry is configured to obtain a primary barring configuration for access control in a wireless communications network. The processing circuitry is configured to obtain a secondary barring configuration for access control in the wireless communications network. The processing circuitry is configured to determine, based on the primary barring configuration and the secondary barring configuration, whether an access attempt by the UE in the wireless communications network is barred.

Also disclosed is a computer program, the computer program comprising instructions configured to perform the above-described method in a user equipment (UE).

Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method in a user equipment (UE).

Also disclosed is a method in a network node. The method comprises transmitting a primary barring configuration for access control in a wireless communications network. The method comprises transmitting a secondary barring configuration for access control in the wireless communications network, the secondary barring configuration associated with an access category associated with an access attempt by a user equipment (UE).

In certain embodiments, the primary barring configuration may comprise a primary barring factor and a primary barring time. In certain embodiments, the secondary barring configuration may comprise a secondary barring factor.

In certain embodiments, the primary barring factor may comprise a percentage value representing a probability that the access attempt by the UE will not be barred, and the secondary barring factor may comprise an indication of whether the primary barring factor should be applied.

In certain embodiments, the primary barring factor may comprise a percentage value representing a probability that the access attempt by the UE will not be barred and the secondary barring factor may comprise a percentage offset.

In certain embodiments, the primary barring factor may indicate a first position within a set, each position within the set associated with a percentage value representing a probability that the access attempt by the UE will not be barred, and the secondary barring factor may comprise a position offset.

In certain embodiments, the secondary barring configuration may further comprise a secondary barring time. In certain embodiments, the secondary barring time may comprise an indication of whether the primary barring time should be applied.

In certain embodiments, transmitting the primary barring configuration may comprise transmitting a plurality of primary barring configurations for a set of access categories, each of the plurality of primary barring configurations associated with one or more access categories in the set of access categories. In certain embodiments, each of the plurality of primary barring configurations may be associated with a respective access category in the set of access categories. In certain embodiments, each of the plurality of primary barring configurations may be associated with multiple access categories in the set of access categories.

In certain embodiments, the primary barring configuration and the secondary barring configuration may be included in system information broadcast by the network node. In certain embodiments, the primary barring configuration may be included in a first type of system information and the secondary barring configuration may be included in a second type of system information. In certain embodiments, the primary barring configuration may be transmitted with a higher repetition frequency than the secondary barring configuration.

Also disclosed is a network node. The network node comprises a receiver, a transmitter, and processing circuitry coupled to the receiver and the transmitter. The processing circuitry is configured to transmit, via the transmitter, a primary barring configuration for access control in a wireless communications network. The processing circuitry is configured to transmit, via the transmitter, a secondary barring configuration for access control in the wireless communications network, the secondary barring configuration associated with an access category associated with an access attempt by a user equipment (UE).

Also disclosed is a computer program, the computer program comprising instructions configured to perform the above-described method in a network node.

Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method in a network node.

Certain embodiments of the present disclosure may provide one or more technical advantages. As one example, certain embodiments may advantageously provide an access barring mechanism that allows for barring on an individual access category basis. As another example, certain embodiments may advantageously provide an access barring mechanism that uses a reasonable amount of signalling and timers in the UE. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 10 illustrates an example of a corresponding Abstract Syntax Notation 1 (ASN.1) representation of the access barring configuration of FIG. 9, in accordance with certain embodiments;

FIG. 11 illustrates an example ASN.1 representation of the secondary barring factor and secondary barring time, in accordance with certain embodiments;

FIG. 12 illustrates an example ASN.1 representation for access category configuration, in accordance with certain embodiments;

DETAILED DESCRIPTION

Figure 1:
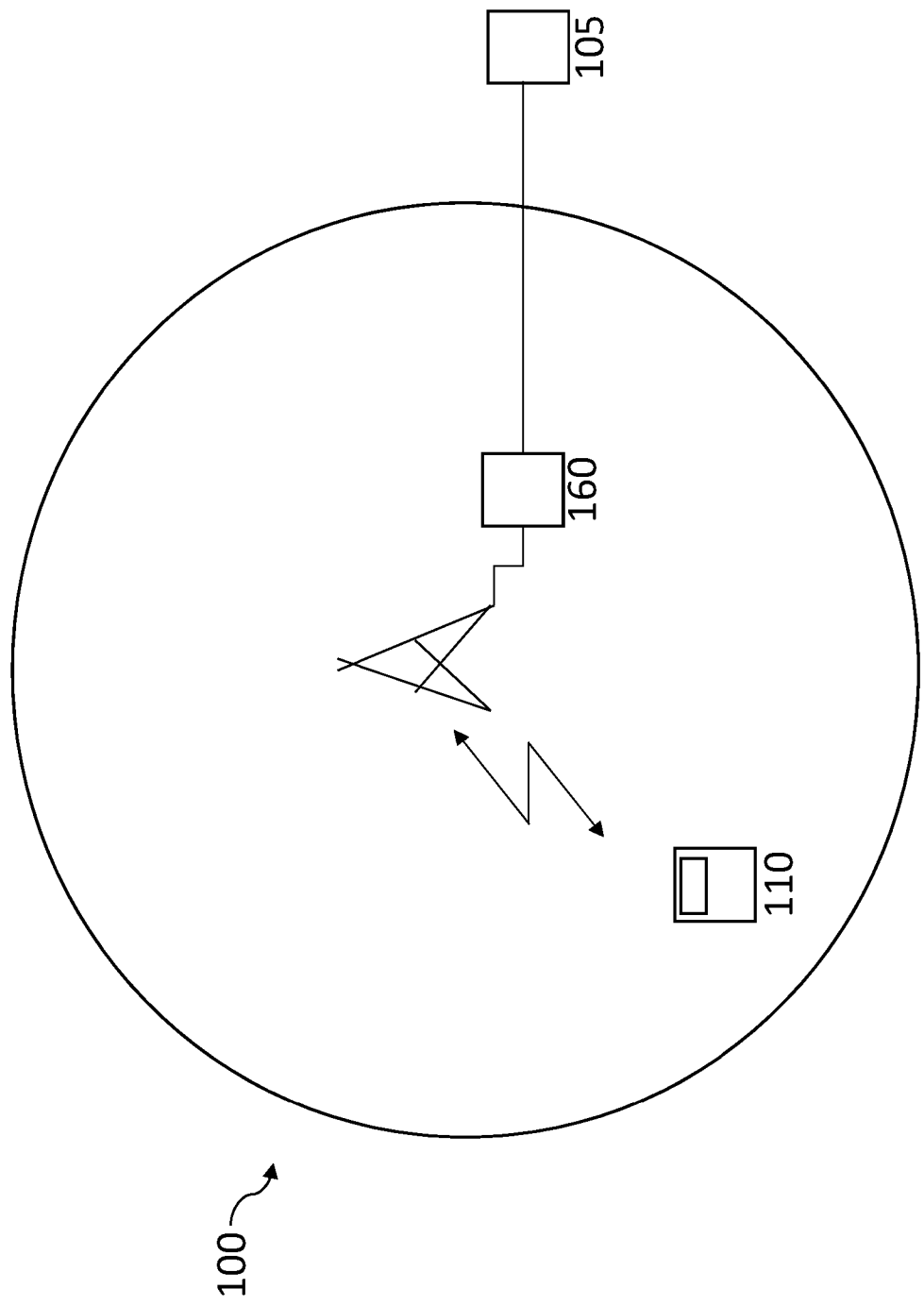
FIG. 1 illustrates an example of a simplified wireless network.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As described above, there currently exist certain challenges with respect to access barring in 5G and future communication systems. The access control mechanism for 5G is expected to have certain features. It is expected that the network node will indicate barring condition(s) for each cell using access barring parameters to UEs. This may be done by system information broadcast within the AS. In the UE, at the NAS level there is expected to be a mapping mechanism used to determine the access category used by the AS in the UE when performing access.

In addition to these features, there are certain characteristics to consider when designing the access barring mechanism, including the parameters used. A first consideration is meeting the "unified access control" (UAC) principle (i.e., whether the mechanism used to indicate barring is common for all the access categories). A second consideration is the amount of signaling resources used by the access barring parameters, whether or not barring is applied. A third consideration is the impact and burden on the UE. For example, there is the issue of how many timers would need to be maintained by the UE in scenarios in which barring is applied on one or several access categories. A fourth consideration is that the access barring parameters should fulfill the needs of the mapping mechanism used to map events to access category.

As described above, ACDC is an example of an access control mechanism. In ACDC, a barring factor and barring time are signalled for each ACDC category (also known as access category) where barring is applied. Additionally, in ACDC there is a ranking of the access categories, which implies that if ACDC category X is barred, all categories with a rank less than X are also barred. This also implies that the barring information of the categories having a rank less than X do not need to be signalled. Moreover, it also implies that the UE only has to maintain one running barring timer. However, there are disadvantages to such an approach. For example, a specified ranking between the access categories is less flexible, because barring cannot be applied on an access category basis. Thus, there is a need for an access barring mechanism that allows for barring on individual access category basis, and still uses a reasonable amount of signalling and timers in the UE.

The present disclosure contemplates various embodiments that may address these and other challenges associated with existing approaches. In certain embodiments, the proposed solutions solve the problem of access barring without using ranking between access categories while still using a reasonable amount of signalling and timers in the UE. According to one example embodiment, a method in a UE is disclosed. The UE obtains a primary barring configuration for access control in a wireless communications network. In certain embodiments, the obtained primary barring configuration may comprise a primary barring factor and a primary barring time. Although the UE may obtain the primary barring configuration in any suitable manner, typically the UE acquires the primary barring configuration from a network node (e.g., an access node, such as an eNB or gNB) that transmits the primary barring configuration to the UE. For example, the network node may transmit the primary barring configuration to the UE using system information broadcast in each cell. In certain embodiments, the primary barring factor and barring time may be common for all access categories.

The UE obtains a secondary barring configuration for access control in the wireless communications network. In certain embodiments, the UE may determine an access category associated with the access attempt by the UE. The secondary barring configuration may be associated with the determined access category. Although the UE may obtain the secondary barring configuration in any suitable manner, typically the UE acquires the secondary barring configuration from a network node (e.g., an access node, such as an eNB or gNB) that transmits the secondary barring configuration to the UE. For example, the network node may transmit the secondary barring configuration to the UE using system information broadcast in each cell. In certain embodiments, the secondary barring configuration may be transmitted by the same network node that transmits the primary barring configuration. In certain embodiments, the secondary barring configuration may be transmitted by a different network node from the network node that transmits the primary barring configuration. In certain embodiments, the secondary barring factor may be a Boolean indicating whether the barring applies on this access category or not. In certain embodiments, the secondary barring configuration may comprise a secondary barring time.

The UE determines, based on the primary barring configuration and the secondary barring configuration, whether an access attempt by the UE in the wireless communications network is barred. As described in more detail herein, in certain embodiments the UE may apply the secondary barring configuration as a modifier of the primary barring configuration. In certain embodiments, when performing this barring check, the UE may combine the secondary barring factor for the access category with the primary barring factor. In response to a determination that the access attempt by the UE in the wireless communications network is not barred, the UE performs the access attempt. In response to a determination that the access attempt by the UE in the wireless communications network is barred, the UE refrains from performing the access attempt. In certain embodiments, when the barring check results in "barred," the UE applies the barring time received from the network. In applying the barring time, the UE may wait for a time period equal to the barring time before determining whether a subsequent access attempt by the UE in the wireless communications network is barred. In certain embodiments, the barring time applied may be the primary barring time included and/or indicated by the primary barring configuration. In certain embodiments, the barring time applied may be a combined barring time. For example, the UE may combine the primary barring time with the secondary barring time to generate a combined barring time.

According to another example embodiment, a method in a network node (e.g., an access node such as an eNB or gNB) is disclosed. The network node transmits (e.g., to a UE) a primary barring configuration for access control in a wireless communications network. In certain embodiments, the primary barring configuration includes at least one primary barring factor and one primary barring time. The network node transmits a secondary barring configuration for access control in the wireless communications network. The secondary barring configuration is associated with an access category associated with an access attempt by a UE. In certain embodiments, the secondary barring configuration may include one or more of a secondary barring factor and a secondary barring time. In certain embodiments, a secondary barring configuration may be included for each access category.

In certain embodiments, the primary barring configuration and the secondary barring configuration may be included in system information broadcast by the network node. In certain embodiments, the primary barring configuration and the secondary barring configuration may be included in the same system information broadcast. In certain embodiments, the primary barring configuration may be included in a first type of system information, and the secondary barring configuration may be included in a second type of system information. In certain embodiments, the primary barring configuration may be transmitted with a higher repetition frequency than the secondary barring configuration.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 7:
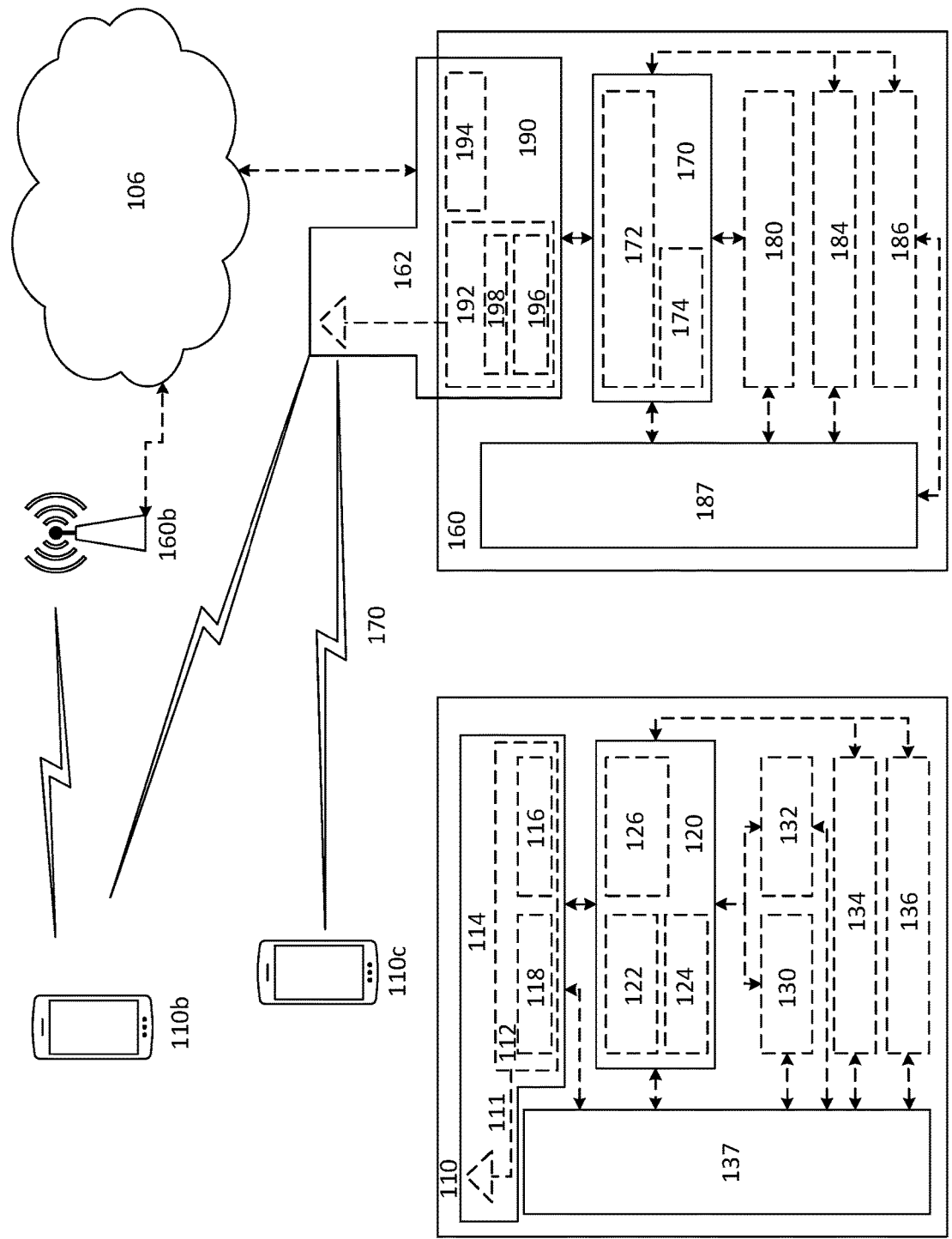
FIG. 7 illustrates an example wireless communications network, in accordance with certain embodiments.

FIG. 7 illustrates an example wireless communications network, in accordance with certain embodiments. Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 106, network nodes 160 and 160b, and wireless devices (WDs) 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and WD 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NRNodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 160 includes processing circuitry 170, device readable medium 180, interface 190, auxiliary equipment 184, power source 186, power circuitry 187, and antenna 162. Although network node 160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 7 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

The present disclosure contemplates various embodiments for access barring in a wireless communications network, such as the example wireless communications network illustrated in FIG. 7. In certain embodiments, WD 110 (e.g., a UE) obtains a primary barring configuration for access control in the wireless communications network. The primary barring configuration may include and/or indicate a primary barring factor and a primary barring time. In certain embodiments, WD 110 may determine an access category associated with the access attempt by WD 110. In certain embodiments, WD 110 may obtain a plurality of primary barring configurations for a set of access categories. Each of the plurality of primary barring configurations may be associated with one or more access categories in the set of access categories. In certain embodiments, each of the plurality of primary barring configurations may be associated with a respective access category in the set of access categories. In certain embodiments, each of the plurality of primary barring configurations may be associated with multiple access categories in the set of access categories.

WD 110 obtains a secondary barring configuration for access control in the wireless communications network. In certain embodiments, the secondary barring configuration may include and/or indicate a secondary barring factor. In certain embodiments, the secondary barring configuration may include and/or indicate a secondary barring time. In some cases, the secondary barring time may be indicate whether the primary barring time should be applied. In some cases, the secondary barring time may be and/or indicate a particular duration. In certain embodiments, the secondary barring configuration may be associated with the determined access category.

WD 110 may obtain the primary and secondary barring configurations in any suitable manner. As one example, WD 110 may obtain the primary and secondary barring configurations from a network node (e.g., network node 160 illustrated in FIG. 7). For example, WD 110 may receive the primary barring configuration and the secondary barring configuration via system information broadcast by a network node. In such a scenario, network node 160 may transmit the primary barring configuration and the secondary barring configuration to WD 110. For example, network node 160 may transmit the primary barring configuration and the secondary barring configuration in system information broadcast by the network node. In certain embodiments, the primary barring configuration and the secondary barring configuration may be included in the same system information. In certain embodiments, the primary barring configuration may be included in a first type of system information, and the secondary barring configuration may be included in a second type of system information. As described in more detail below, in certain embodiments the primary barring configuration may be transmitted to WD 110 with a higher repetition frequency than the secondary barring configuration.

The primary barring factor and secondary barring factor may take a variety of forms. As one example, the primary barring factor may be a percentage value representing a probability that the access attempt by wireless device 110 will not be barred, and the secondary barring factor may be an indication of whether the primary barring factor should be applied. As another example, the primary barring factor may be a percentage value representing a probability that the access attempt by WD 110 will not be barred, and the secondary barring factor may be a percentage offset. As still another example, the primary barring factor may indicate a first position within a set, each position within the set associated with a percentage value representing a probability that the access attempt by WD 110 will not be barred, and the secondary barring factor may be a position offset.

WD 110 determines, based on the primary barring configuration and the secondary barring configuration, whether an access attempt by WD 110 in the wireless communications network is barred. In response to a determination that the access attempt by WD 110 in the wireless communications network is barred, WD 110 refrains from performing the access attempt. Conversely, in response to a determination that the access attempt by WD 110 in the wireless communications network is not barred, WD 110 performs the access attempt.

Depending on the format of the primary barring configuration and the secondary barring configuration, WD 110 may determine whether the access attempt is barred in a variety of ways.

As one example, the primary barring factor may be a percentage value representing a probability that the access attempt by WD 110 will not be barred, and the secondary barring factor may be an indication of whether the primary barring factor should be applied (as described above). In such a scenario, to determine whether the access attempt by WD 110 is barred, WD 110 determines whether the secondary barring factor indicates that the primary barring factor should be applied. In response to determining that the secondary barring factor indicates that the primary barring factor should not be applied, WD 110 determines that the access attempt by WD 110 is not barred.

In certain embodiments, in response to determining that the secondary barring factor indicates that the primary barring factor should be applied, WD 110 generates a random number. WD 110 compares the generated random number to the percentage value representing the probability that the access attempt by WD 110 will not be barred (i.e., the primary barring factor). In certain embodiments, WD 110 may determine that the access attempt is not barred when the random number is less than the percentage value representing the probability that the access attempt by WD 110 will not be barred. Conversely, WD 110 may determine that the access attempt is barred when the generated random number is equal to or greater than the percentage value representing the probability that the access attempt by WD 110 will not be barred.

If, in this example scenario, WD 110 determines that the access attempt is barred, WD 110 may wait for a time period equal to the primary barring time (included and/or indicated by the primary barring configuration) before determining whether a subsequent access attempt by WD 110 in the wireless communications network is barred. As described above, the secondary barring configuration may include and/or indicate a secondary barring time. The secondary barring time may provide an indication of whether the primary barring time should be applied and/or indicate a duration of time. In certain embodiments, WD 110 may also take into account the secondary barring time. For example, assume that the secondary barring time provides an indication of whether the primary barring time should be applied. In such a scenario, WD 110 may determine whether the secondary barring time indicates that the primary barring time should be applied. If the secondary barring time indicates that the primary barring time should be applied, WD 110 may wait for a time period equal to the primary barring time before determining whether a subsequent access attempt by WD 110 in the wireless communications network is barred. As another example, assume that the secondary barring time indicates a duration of time. In such a scenario, WD 110 may combine the secondary barring time with the primary barring time to generate a combined barring time, and wait for a time period equal to the combined barring time before determining whether a subsequent access attempt by WD 110 in the wireless communications network is barred.

As another example, the primary barring factor may be a percentage value representing a probability that the access attempt by WD 110 will not be barred, and the secondary barring factor may be a percentage offset. In such a scenario, to determine whether the access attempt by WD 110 is barred, WD 110 combines the percentage value representing the probability that the access attempt by WD 110 will not be barred with the percentage offset to obtain a combined barring factor. The determination of whether the access attempt by WD 110 in the wireless communications network is barred is then based on the combined barring factor.

As another example, the primary barring factor may indicate a first position within a set. Each position within the set may be associated with a percentage value representing a probability that the access attempt by WD 110 will not be barred. Additionally, the secondary barring factor may be and/or indicate a position offset. In such a scenario, to determine whether the access attempt by WD 110 is barred, WD 110 applies the position offset to the first position to obtain a combined barring factor. The determination of whether the access attempt by WD 110 in the wireless communications network is barred is then based on the combined barring factor.

For both of the scenarios described above that involve a combined barring factor, WD 110 may determine whether the access attempt by WD 110 in the wireless communications network is barred by generating a random number and comparing the generated random number to the combined barring factor. In such a scenario, WD 110 may determine that the access attempt is not barred when the random number is less than the combined barring factor. Conversely, WD 110 may determine that the access attempt is barred when the random number is equal to or greater than the combined barring factor.

As described above, the secondary barring configuration may include and/or indicate a secondary barring time. The secondary barring time may provide an indication of whether the primary barring time should be applied and/or indicate a duration of time. In certain embodiments, WD 110 may also take into account the secondary barring time. For example, assume that the secondary barring time provides an indication of whether the primary barring time should be applied. In such a scenario, WD 110 may determine whether the secondary barring time indicates that the primary barring time should be applied. If the secondary barring time indicates that the primary barring time should be applied, WD 110 may wait for a time period equal to the primary barring time before determining whether a subsequent access attempt by WD 110 in the wireless communications network is barred. As another example, assume that the secondary barring time indicates a duration of time. In such a scenario, WD 110 may combine the secondary barring time with the primary barring time to generate a combined barring time, and wait for a time period equal to the combined barring time before determining whether a subsequent access attempt by WD 110 in the wireless communications network is barred.

Additional details on the various embodiments described above in relation to FIG. 7 and their implementation are described below in relation to FIGS. 8-16.

Figure 8:
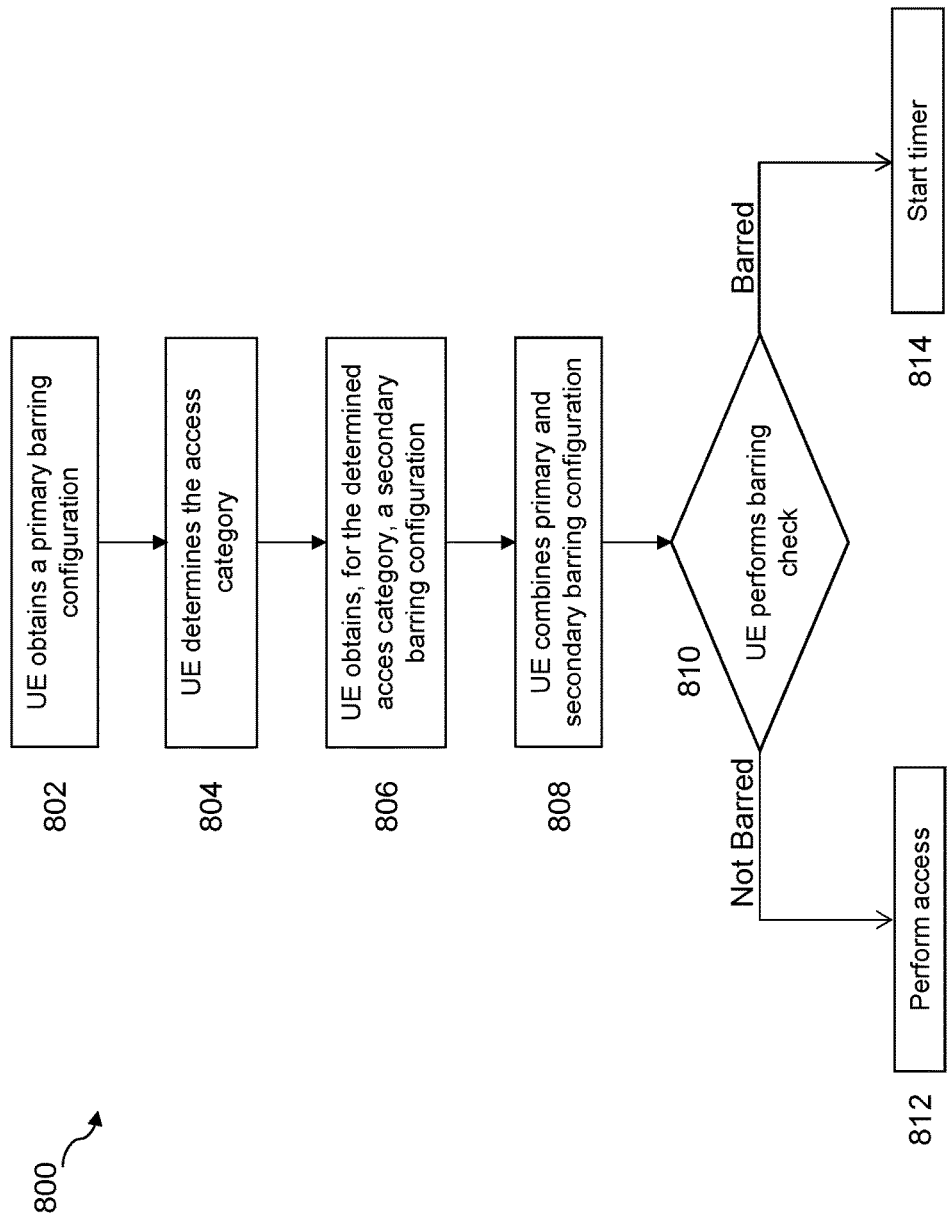
FIG. 8 is a flowchart of a method in a UE, in accordance with certain embodiments.

FIG. 8 is a flowchart of a method 800 in a UE, in accordance with certain embodiments. Method 800 begins at step 802, where the UE obtains a primary barring configuration. As described above in relation to FIG. 7, in certain embodiments UE obtains the primary barring configuration from a network node (e.g., network node 160 described above in relation to FIG. 7) as part of system information broadcast by the network node in each cell. In certain embodiments, step 802 may occur before the UE makes an access attempt. As described above in relation to FIG. 7, the primary configuration may, for example, contain a primary barring factor and a primary barring time. The primary barring factor can be represented in many different ways. For example, the primary barring factor can be expressed as a probability that a UE attempting access will pass the barring check (i.e., not be barred), such as a percentage (e.g., a value in the range [0%, 5%, 10%, . . . , 95%] in steps of 5% (although other increments may also be used)). As another example, the primary barring factor may indicate a position within a set, where each position within the set is associated with a percentage value representing a probability that the access attempt by the UE will not be barred. The primary barring time may, for example, be represented in seconds, such as a value in the range [4 s, 8 s, . . . 512 s], in steps of powers of two (although other increments may also be used). In alternative embodiments, the percentage value represented by the primary barring factor may be (or the position in the set may represent) a probability that the access attempt by the UE will be barred.

At step 804, the UE determines an access category associated with an access attempt. There are several methods of how to determine the access category. As one example, the access category may be determined based on the call type, such as "mobile originating call", or "mobile originating signalling." As another example, the access category may be determined based on the Access Class stored in the SIM (Subscriber Identity Module) of the UE.

Although FIG. 8 illustrates the UE obtaining a primary barring configuration and then determining the access category, the present disclosure is not limited to this example. Rather, the present disclosure contemplates that in certain embodiments the UE may determine the access category associated with the access attempt and then obtain the primary barring configuration.

At step 806, the UE obtains a secondary barring configuration for the access category determined in step 804. As described above in relation to FIG. 7, in certain embodiments a network node (e.g., an access node such as an eNB or gNB) transmits the secondary barring configuration, for example using broadcasted system information. The secondary barring configuration may include and/or indicate a secondary barring factor. In certain embodiments, the secondary barring configuration may also include and/or indicate a secondary barring time.

At step 808, the UE combines the primary barring configuration obtained in step 802 with the secondary barring configuration obtained in step 806. The UE may combine the primary barring configuration obtained in step 802 with the secondary barring configuration obtained in step 806 in a variety of ways. As one example, the UE may combine the primary barring factor with the secondary barring factor to generate a combined barring factor (CBF). In certain embodiments, the UE may also combine the primary barring time with the secondary barring time, if applicable (e.g., when the secondary barring time is available), to generate a combined barring time (CBT). In certain embodiments, the value of the CBF may be a percentage value representing a probability that a UE attempting access will pass the barring check (e.g., a value in the range [0%, 5%, 10%, . . . , 100%] in steps of 5% (although other increments may also be used)). Example embodiments illustrating how the primary and secondary barring configuration may be combined are described in more detail below.

At step 810, the UE performs a barring check. In certain embodiments, the barring check of step 810 may be performed using the CBF determined in step 808. As an example of a barring check, the UE may draw a random number in the range of 0 . . . 100 and compare it with CBF, represented as a percentage. If the random number is lower than the value of CBF, the output of the barring check is "Not Barred". If the random number is higher than, or equal to, the value CBF, the output of the barring check is "Barred".

Figure 2:
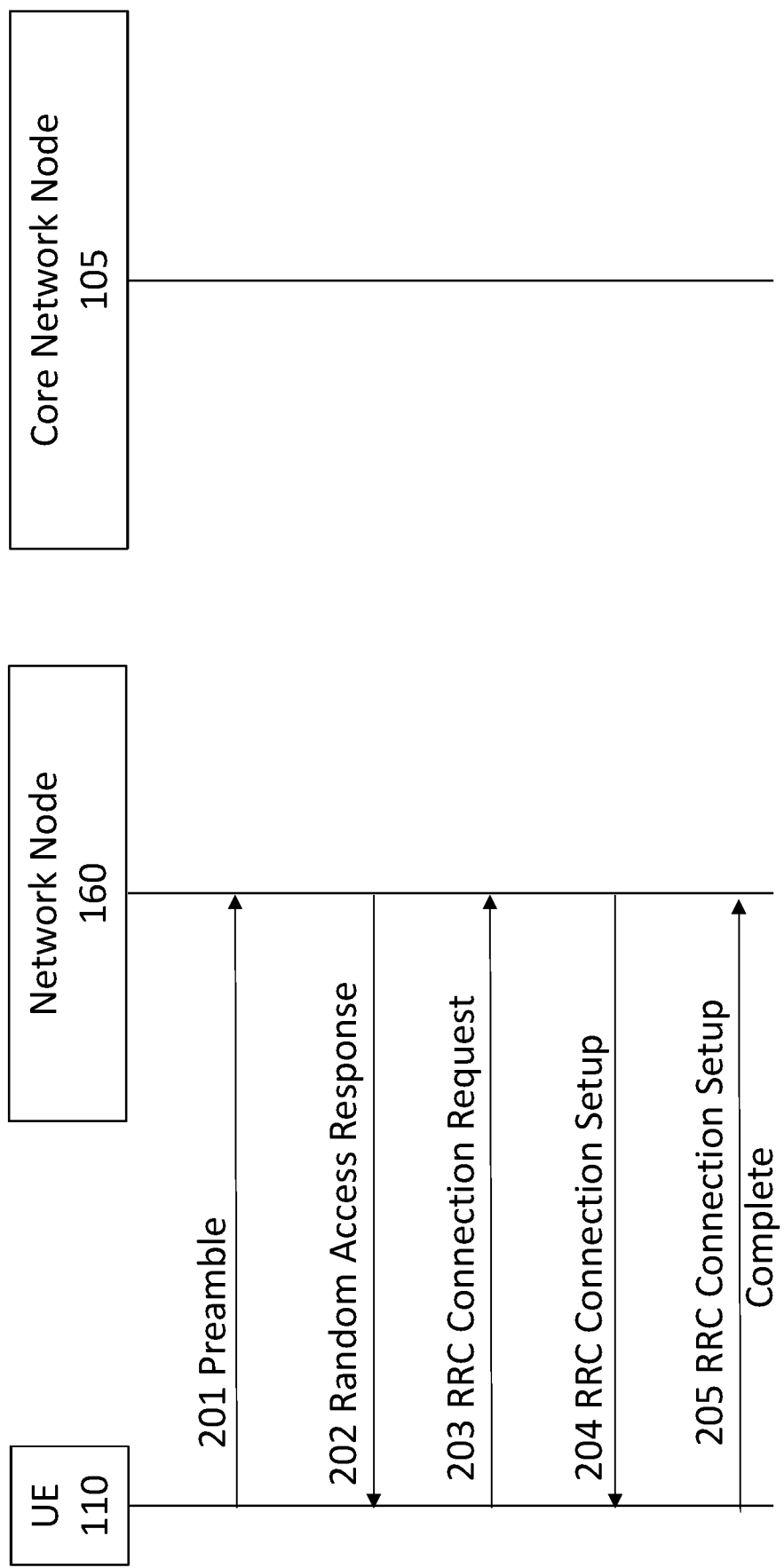
FIG. 2 is a signal flow diagram illustrating an example of random access and radio resource control connection establishment in 3GPP LTE.
Figure 3:
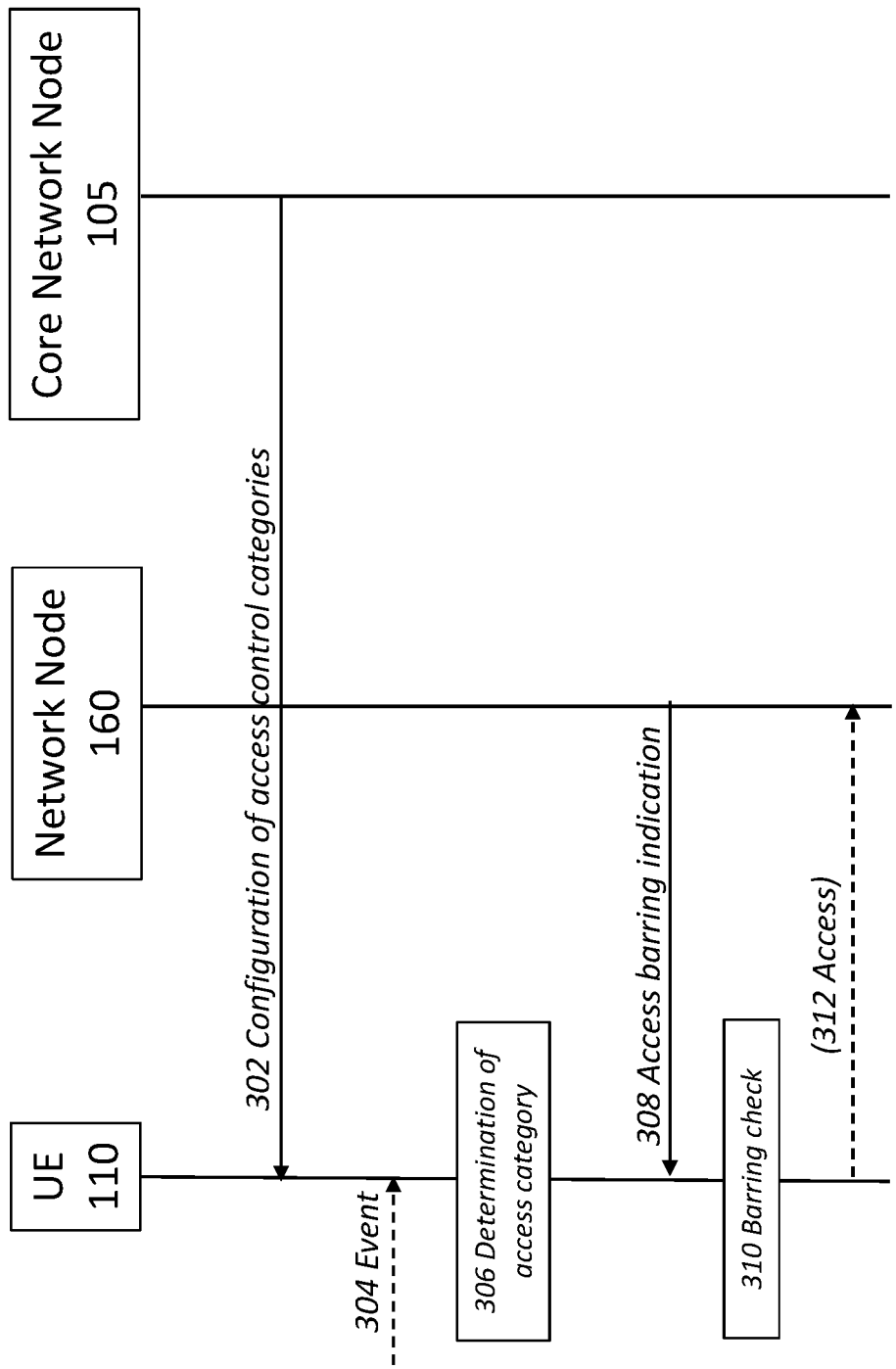
FIG. 3 is a signalling diagram illustrating an example procedure for unified access control.
Figure 4:
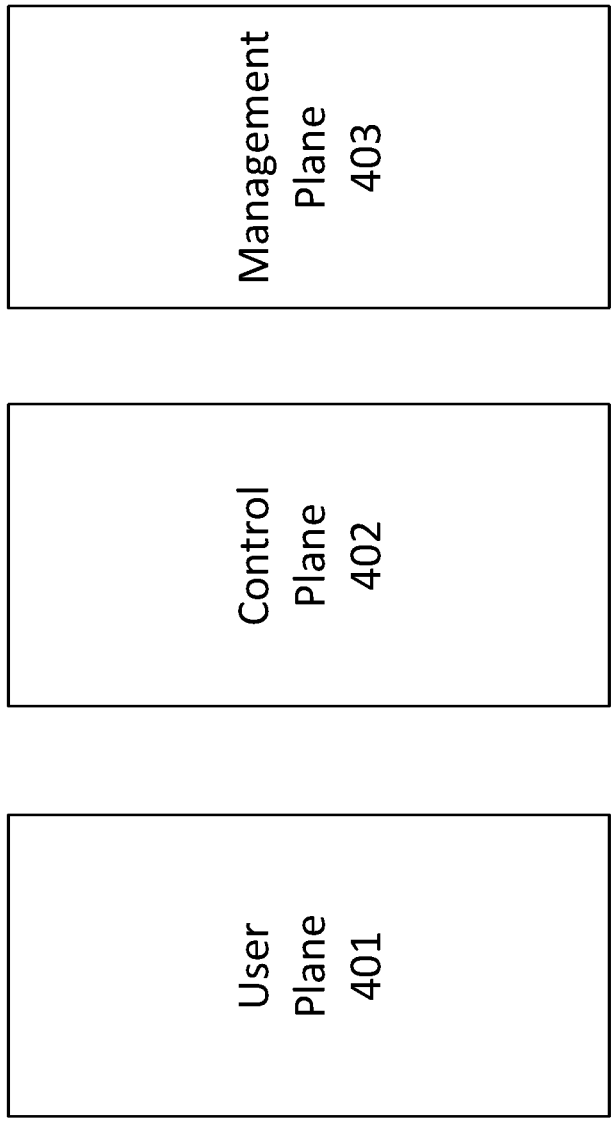
FIG. 4 illustrates the planes in a communication system.
Figure 5:
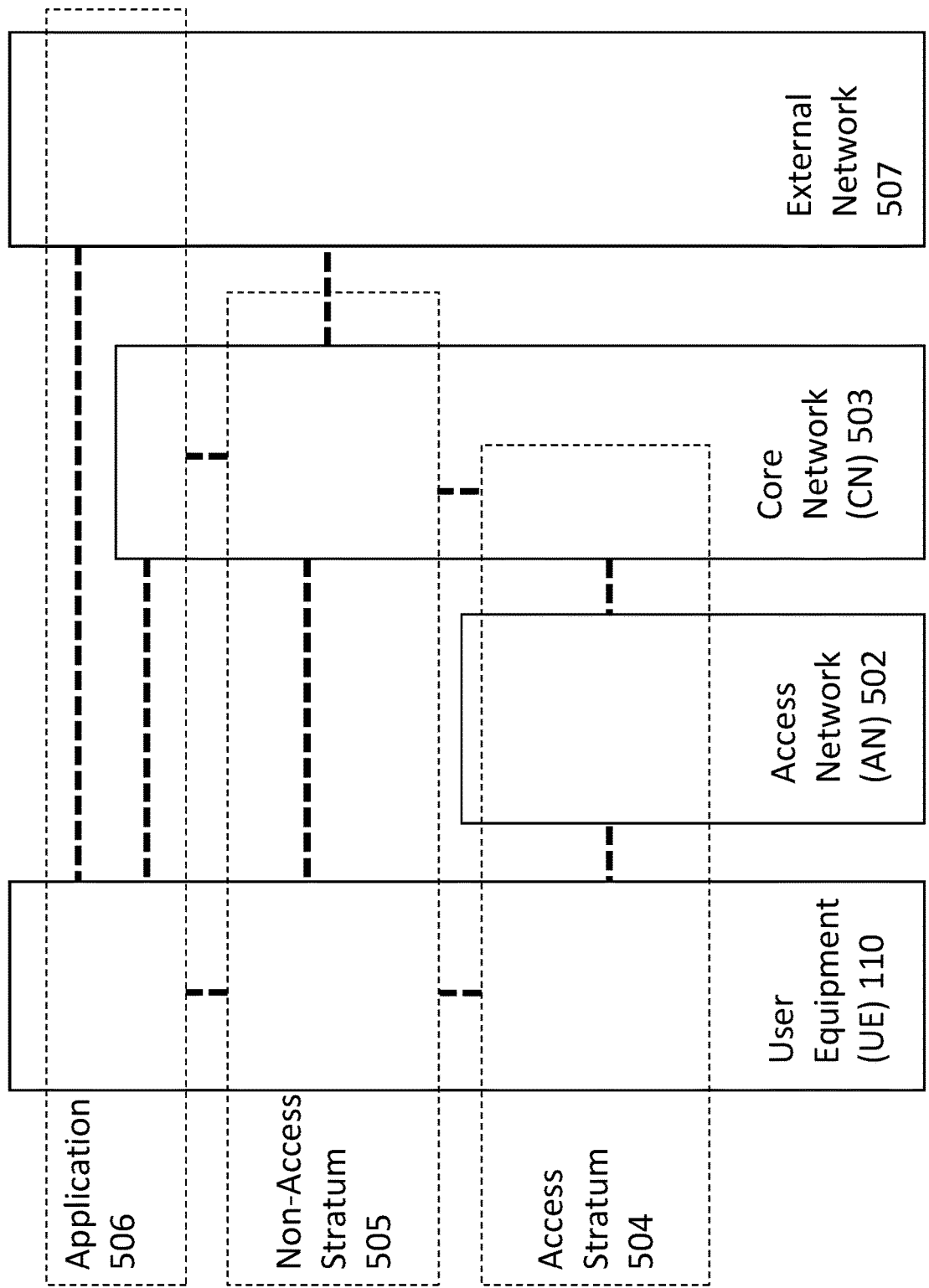
FIG. 5 illustrates division of the 3GPP system into domains and strata.
Figure 6:
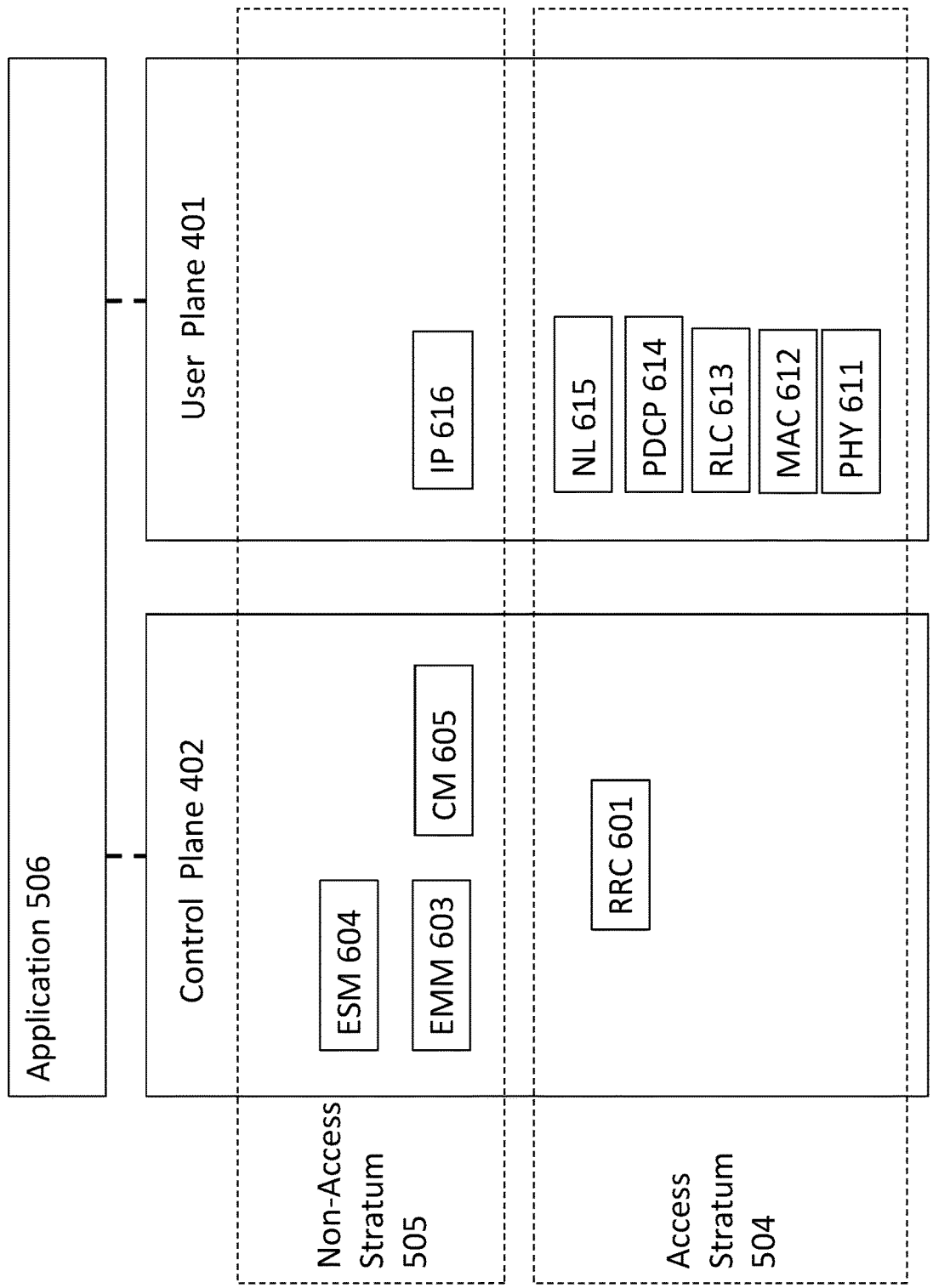
FIG. 6 illustrates protocol layers in the user plane and control plane of a 3GPP system.

If the output of the barring check in step 810 is "Not Barred," at step 812 the UE proceeds with the access attempt (e.g., by performing a random access and RRC connection establishment procedure as described above in relation to FIG. 2). If, however, the output of the barring check in step 810 is "Barred," at step 814 the UE starts a timer set to the value of the CBT. When this timer expires, the UE may repeat the steps of method 800.

Figure 9:
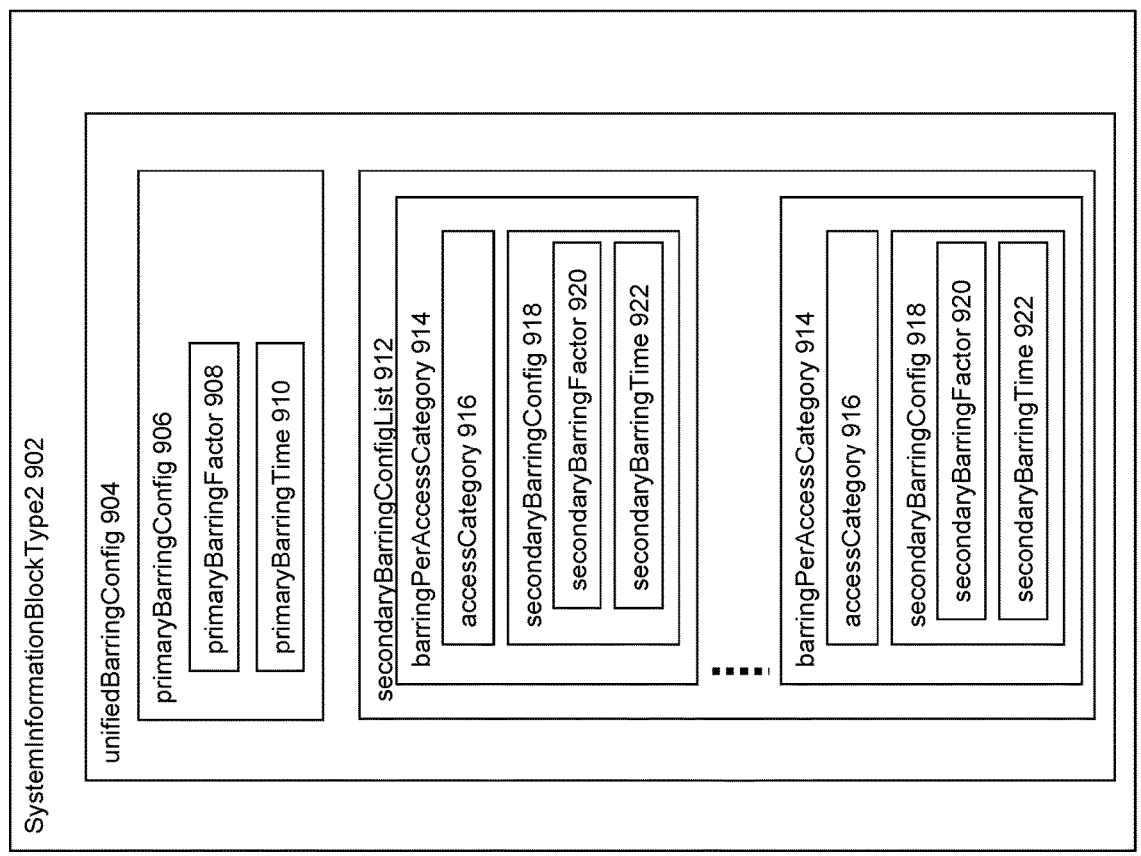
FIG. 9 illustrates an example of how an access barring configuration may be included in system information, in accordance with certain embodiments.

FIG. 9 illustrates an example of how an access barring configuration may be included in system information, in accordance with certain embodiments. More particularly, FIG. 9 illustrates how an access barring configuration, represented in FIG. 9 as unifiedBarringConfig 904, is included in system information, represented in FIG. 9 as SystemInformationBlockType2 902. In the example of FIG. 9, unifiedBarringConfig 904 contains a primary barring configuration, represented as primaryBarringConfig 906, and a secondary barring configuration, represented as secondaryBarringConfigList 912.

In the example of FIG. 9, primaryBarringConfig 906 contains a primary barring factor, represented as primaryBarringFactor 908, and a primary barring time, here represented as primaryBarringTime 910.

The secondaryBarringConfigList 912 contains a list of secondary barring configuration elements for each access category, where each of these elements are represented as barringPerAccessCategory 914. The barringPerAccessCategory 914 contains the access category for which this secondary barring information is applicable, here represented as accessCategory 916. The barringPerAccessCategory 914 also contains the secondary barring configuration for the access category, here represented as secondaryBarringConfig 918.

In the example of FIG. 9, secondaryBarringConfig 918 contains a secondary barring factor, here represented as secondaryBarringFactor 920 and a secondary barring time, here represented as secondaryBarringTime 922. Although the example of FIG. 9 illustrates secondaryBarringConfig 918 as including secondaryBarringTime 922, the present disclosure is not limited to such an example. Rather, the present disclosure contemplates that in certain embodiments, secondaryBarringConfig 918 may only contain a secondary barring factor.

FIG. 10 illustrates an example of a corresponding ASN.1 representation of the access barring configuration of FIG. 9, in accordance with certain embodiments. In the example of FIG. 10, the unifiedBarringConfig-904 contains the primary barring configuration, primaryBarringConfig-906 and secondary barring configuration, secondaryBarringConfigList-912. Typically, to indicate that no barring is applied in the cell, the unifiedBarringConfig-904 is not present in the system information (in this example SystemInformationBlockType2). It should be understood that there are several ways to indicate that no barring is applied (e.g., to include the value 100% for the primary barring factor (meaning 100% probability for access)). In this example, the value 100% is not needed since the unifiedBarringConfig-902 is optional in the system information block.

There are several examples of how the secondary barring factor and the secondary barring time may be represented. An example of an ASN.1 representation of a secondary barring factor and secondary barring time is described below in relation to FIG. 11.

FIG. 11 illustrates an example ASN.1 representation of the secondary barring factor and secondary barring time, in accordance with certain embodiments. For the secondary barring factor, represented in FIG. 11 as SecondaryBarringFactor-920, three alternative example embodiments are illustrated. In the first example embodiment, represented as secondaryBarringFactor1 in FIG. 11, the secondary barring factor is a Boolean value (with values "YES" or "NO"), or alternatively a single bit with value either "0" or "1". In this first example embodiment, a value "YES" means that the UE should apply the primary barring factor in the barring check. In other words, the CBF is set to the value of the primary barring factor. On the other hand, a value "NO" means that the primary barring factor is not applied and the barring check will always result in "Not Barred," independent of the value of the primary barring factor. In other words, the CBF is set to 100%.

In a second example embodiment, represented as secondaryBarringFactor2 in FIG. 11, the secondary barring factor is a percentage offset, such as, but not limited to, a value in the range [−30%, −20%, −10%, +10%, +20%, +30%]. In this second example embodiment, the UE adds the numerical percentage offset value to the primary barring factor. For example, if the primary barring factor is 50%, and the secondary barring factor is +20%, the combination of these factors results in the CBF with the value 70%. In another example, if the primary barring factor is 50%, and the secondary barring factor is −20%, the combination of these factors results in 30%.

In a third example embodiment, represented as secondaryBarringFactor3 in FIG. 11, the secondary barring factor is an offset used to pick a different value for the primary barring factor than was obtained by the UE (e.g., as described above in relation to step 802 of FIG. 8 described above). For example, if the primary barring factor is represented by a value in a range with 16 steps, as in the example in FIG. 10, the secondary barring factor is the number of steps that should be moved in this 16-level representation. In one example, if the primary barring factor obtained by the UE is 50% (the 9$^{th}$ value in the example embodiment of FIG. 10), and the secondary barring factor is set to +2, the combination of these factors is the 11$^{th}$ value of barring factor. In other words, the CBF is set to 70%. In another example, if the primary barring factor obtained by the UE is 50% (the 9$^{th}$ value in the example embodiment of FIG. 10), and the secondary barring factor is set to −2, the combination of these factors is the 7$^{th}$ value of barring factor. In other words, the CBF is set to 30%.

For the secondary barring time, represented as SecondaryBarringTime-922 in FIG. 11, three alternative embodiments are illustrated. In a first example embodiment, represented as secondaryBarringTime1, the secondary barring time is a Boolean value (with values "YES" or "NO"), or alternatively a single bit with value either "0" or "1". In this first example embodiment, a value "YES" means that the UE should apply the primary barring time if the barring check results in "Barred." In other words, the CBT is set to the value of the primary barring time. A value "NO," on the other hand, means that the primary barring time is not applied. In other words, the CBT is set to zero.

In a second example embodiment, represented as secondaryBarringTime2 in FIG. 11, the secondary barring time is a time offset, such as a value in the range [−128 s, −32 s, +32 s, +128 s]. In this example embodiment, the UE adds the numerical time offset value to the primary barring time. For example, if the primary barring time is 128 seconds, and the secondary barring time is +128 s, the combination of these factors results in a CBT with the value 256 seconds. As another example, if the primary barring time is 128 seconds, and the secondary barring time is −128 s, the combination of these results in the CBT set to zero.

In a third example embodiment, represented as secondaryBarringTime3 in FIG. 11, the secondary barring time is an offset used to pick a different value for the primary barring time than was obtained by the UE (e.g., as described above in relation to step 802 of FIG. 8 described above). For example, if the primary barring time is represented by a value in a range with 8 steps, as in the example in FIG. 10 described above, the secondary barring time is the number of steps that should be moved in this 8-level representation. As one example, if the primary barring time the UE obtained is 32 seconds (the 4$^{th}$ value in the example of FIG. 10), and the secondary barring time is set to +2, the combination of these factors is the 6$^{th}$ value of barring time. In other words, the CBT would be 128 seconds. In another example, if the primary barring time the UE obtained is 32 seconds (the 4$^{th}$ value in the example of FIG. 10), and the secondary barring time is set to −2, the combination of these is the 2$^{nd}$ value of barring time. In other words, the CBT would be 8 seconds.

According to another example embodiment, an alternative approach is disclosed for multiple access categories. In this alternative embodiment, rather than providing a single primary barring configuration, the network may provide a list of multiple primary barring configurations, one for each of the access categories 0-7. In some cases, such as when configured rules are used to determine the access category, but the UE does not have any valid rules (e.g., when roaming into another operator's network or changing registration area), the UE would use one of the access categories in the range 0-6 instead. These categories are used the "default" or "standardised" access categories. The primary access configuration for access category 7 is used when the UE uses an access category above 8, and corresponds to the cases described above in relation to FIGS. 9-11. When the UE uses an access category in the range 0 . . . 6, it uses the specific primary barring configuration for the determined access category.

In this embodiment, the network still transmits a primary barring configuration and connects this barring configuration to Access Category 0 or whatever Access Category that is specified as a "default Access Category." For example, if a list according to the following (or something similar) is specified, the primary barring configuration will instead be connected to Access Category 7.

| | |
|---|---|
| Access Category 0 | Reserved for NSPS |
| Access Category 1 | Emergency Calls |
| Access Category 2 | Reserved for HPLMN |
| Access Category 3 | mt-Access (Paging) |
| Access Category 4 | mo-Signaling (NAS) |
| Access Category 5 | VoiceCall/MMTel |
| Access Category 6 | RAN Area Update |
| Access Category 7 | Default |

If only Barring Factors for Access Category 7 are broadcast, then this will normally apply for all other access categories with a higher access category value, (i.e., 8− . . . ). If specific barring factors should apply for specific access categories, these too need to be broadcast. An example ASN.1 representation for this example embodiment is described below in relation to FIG. 12.

FIG. 12 illustrates an example ASN.1 representation for access category configuration, in accordance with certain embodiments. In the example of FIG. 12, The primary barring configuration is a list of primary barring information for each access category, where the access category is a value in the range 0 . . . 7.

In broadcasting barring factors and barring times (or any other type of barring parameters) for specific access categories, in this alternative embodiment, this is done by "delta-signalling" from the default access category level, similar to the description of for secondary barring configuration.

For example, if Access Category 7 (Default) broadcast Barring factor 0.7, the barring factor for, e.g., Access Category 12 may be signalled as an offset to Access Category 7, such that: Barring Factor—+0.3 or Barring Factor −0.3. Advantageously, this signalling, if setting a limited predetermined set of "offset" levels from the Default Category, would allow bit savings in the signalling of access barring parameters for all other access categories.

For example, if there are 4 bits to indicate a default barring level and 3 bits to indicate a default barring time for Access Categories 0 . . . 7, it may be sufficient with fewer bits to indicate barring for access categories 8 . . . n with, e.g., 3 bits for barring level and 2 bits for barring time. The Access Category 8 . . . n barring parameter is the secondary barring configuration in this embodiment and could be the same as for the embodiment described above in relation to FIG. 11. This would then be interpreted as an offset (except for codepoint 0 and 7) for the barring factor and otherwise the amount of steps that should be moved in the 16-level representation value of Access Category 7.

If Access Category 7 barring parameter indicates p40 (i.e., code value 7), and Access Category 12 receive a delta signalling according to the above (with only 3 bits) of code value 2, it should interpret this in the 4-bit representation as p40 minus two steps (i.e., correspond this to code-point 5 and pick the value p25). In this way, there could be a more efficient signalling at the cost of the finest granularity offset, but the granularity absolute values could anyway be maintained through keeping the 4-bit barring factor in on the standardized categories. In certain embodiments, the same reasoning is applied for the barring time.

To make signalling even more efficient, in certain embodiments both the barring factor and barring time may be included in the example above. For example, an offset to a default value may only concern an offset to one of the barring parameters. Then, if some parameters are not included in the barring parameter signalling, the value of the default Access Category (7) should be used.

As described above, the primary barring configuration and the secondary barring configuration may be transmitted by a network node, for example in system information broadcast by the network node in each cell. Typically, it is important to turn on the access barring quickly. In other words, the primary parameters might need to go from "no barring" (which may be indicated by that the barring parameters are not present in the system information) to, for example, barring factor 30% (and back) quickly. On the other hand, change of the secondary parameters may happen less frequently as they control how individual access categories are barred relatively each other.

To address this, in certain embodiments the primary barring configuration may be included in a first system information block, for example SystemInformationBlockType2, and the secondary barring configuration may be included into a second system information block, for example SystemInformationBlockType3. The network then broadcasts the first system information block, for example SystemInformationBlockType2, using a higher repetition frequency than the second system information block, for example SystemInformationBlockType3. Such an approach may advantageously save some radio resources as the secondary barring parameters are sent less frequently than the primary barring parameters. This approach may be combined with any of the embodiments described above, for example, by putting the primary barring configuration (primaryBarringConfig or primaryBarringConfigList) into a different system information block than the secondary barring configuration (secondaryBarringConfigList).

Figure 13:
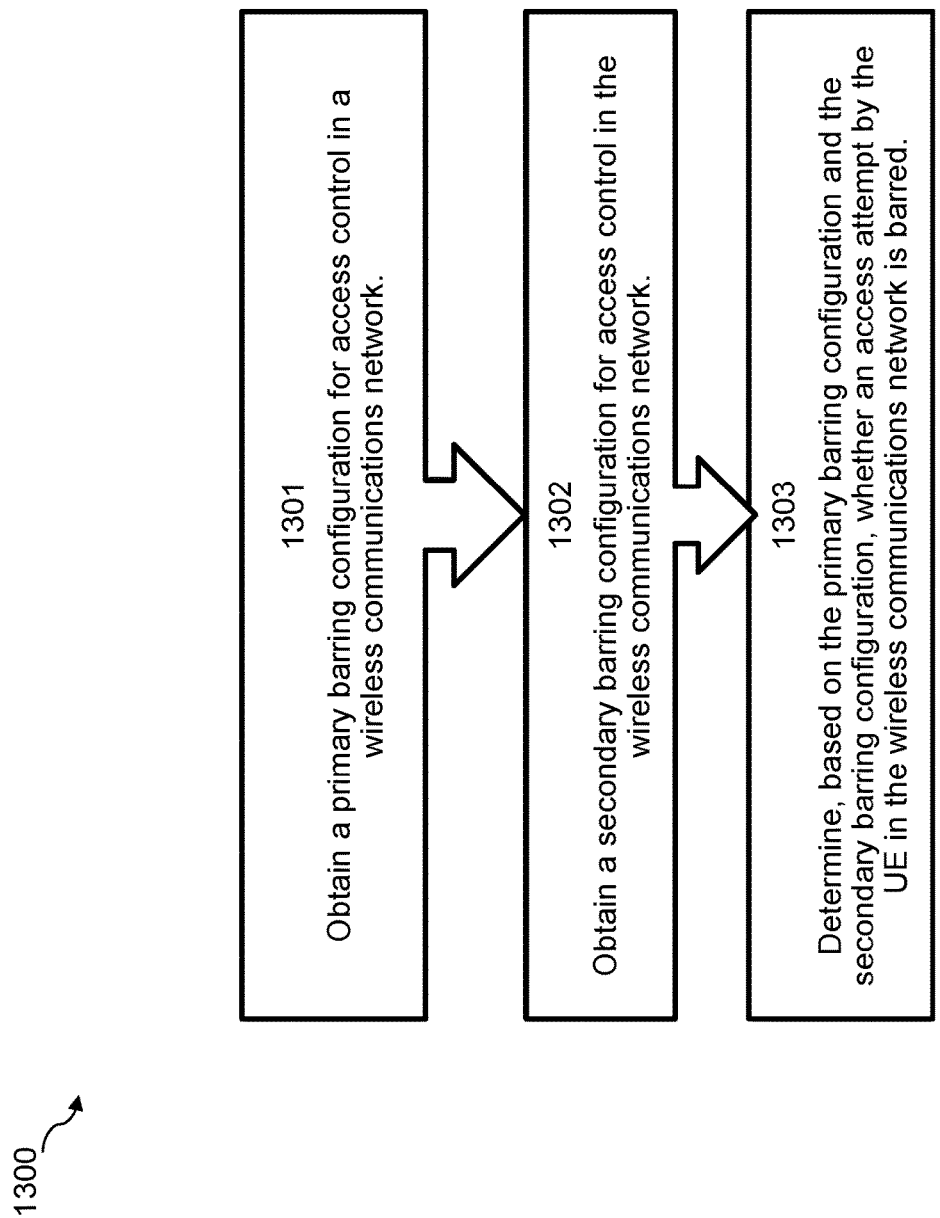
FIG. 13 is a flowchart of a method in a UE, in accordance with certain embodiments.

FIG. 13 is a flowchart of a method 1300 in a UE, in accordance with certain embodiments. Method 1300 begins at step 1301, where the UE obtains a primary barring configuration for access control in a wireless communications network. In certain embodiments, the primary barring configuration may comprise a primary barring factor and a primary barring time.

At step 1302, the UE obtains a secondary barring configuration for access control in the wireless communications network. In certain embodiments, the secondary barring configuration may comprise a secondary barring factor. In certain embodiments, the secondary barring configuration may comprise a secondary barring time.

In certain embodiments, the primary barring configuration and the secondary barring configuration may be received via system information broadcast by a network node.

In certain embodiments, the UE may determine an access category associated with the access attempt by the UE. In certain embodiments, the secondary barring configuration may be associated with the determined access category.

At step 1304, the UE determines, based on the primary barring configuration and the secondary barring configuration, whether an access attempt by the UE in the wireless communications network is barred.

In certain embodiments, the UE may, in response to a determination that the access attempt by the UE in the wireless communications network is barred, refrain from performing the access attempt. In certain embodiments, the UE may, in response to a determination that the access attempt by the UE in the wireless communications network is not barred, perform the access attempt.

In certain embodiments, the primary barring factor may comprise a percentage value representing a probability that the access attempt by the UE will not be barred and the secondary barring factor may comprise an indication of whether the primary barring factor should be applied. To determine whether the access attempt by the UE in the wireless communications network is barred, the UE may determine whether the secondary barring factor indicates that the primary barring factor should be applied. In certain embodiments, the UE may, in response to determining that the secondary barring factor indicates that the primary barring factor should not be applied, determine that the access attempt by the UE is not barred. In certain embodiments, the UE may, in response to determining that the secondary barring factor indicates that the primary barring factor should be applied, generate a random number and compare the generated random number to the percentage value representing the probability that the access attempt by the UE will not be barred. In certain embodiments, the UE may determine that the access attempt is not barred when the random number is less than the percentage value representing the probability that the access attempt by the UE will not be barred. In certain embodiments, the UE may determine that the access attempt is barred when the random number is equal to or greater than the percentage value representing the probability that the access attempt by the UE will not be barred. In certain embodiments, the UE may wait for a time period equal to the primary barring time before determining whether a subsequent access attempt by the UE in the wireless communications network is barred.

In certain embodiments, the secondary barring time may comprise an indication of whether the primary barring time should be applied. In certain embodiments, if the secondary barring time indicates that the primary barring time should be applied, the UE may wait for a time period equal to the primary barring time before determining whether a subsequent access attempt by the UE in the wireless communications network is barred.

In certain embodiments, the primary barring factor may comprise a percentage value representing a probability that the access attempt by the UE will not be barred, and the secondary barring factor may comprise a percentage offset. The UE may combine the percentage value representing the probability that the access attempt by the UE will not be barred with the percentage offset to obtain a combined barring factor. The UE may determine whether the access attempt by the UE in the wireless communications network is barred based on the combined barring factor. In certain embodiments, the primary barring factor may indicate a first position within a set, each position within the set associated with a percentage value representing a probability that the access attempt by the UE will not be barred. The secondary barring factor may comprise a position offset. The UE may apply the position offset to the first position to obtain a combined barring factor. The UE may determine whether the access attempt by the UE in the wireless communications network is barred based on the combined barring factor.

In certain embodiments, the UE may determine whether the access attempt by the UE in the wireless communications network is barred by generating a random number and comparing the generated random number to the combined barring factor. In certain embodiments, the UE may determine that the access attempt is not barred when the random number is less than the combined barring factor. In certain embodiments, the UE may determine that the access attempt is barred when the random number is equal to or greater than the combined barring factor. In certain embodiments, the secondary barring configuration may comprise a secondary barring time, and the UE may combine the secondary barring time with the primary barring time to generate a combined barring time. The UE may wait for a time period equal to the combined barring time before determining whether a subsequent access attempt by the UE in the wireless communications network is barred.

In certain embodiments, obtaining the primary barring configuration may comprise obtaining a plurality of primary barring configurations for a set of access categories. Each of the plurality of primary barring configurations may be associated with one or more access categories in the set of access categories. In certain embodiments, each of the plurality of primary barring configurations may be associated with a respective access category in the set of access categories. In certain embodiments, each of the plurality of primary barring configurations may be associated with multiple access categories in the set of access categories.

Figure 14:
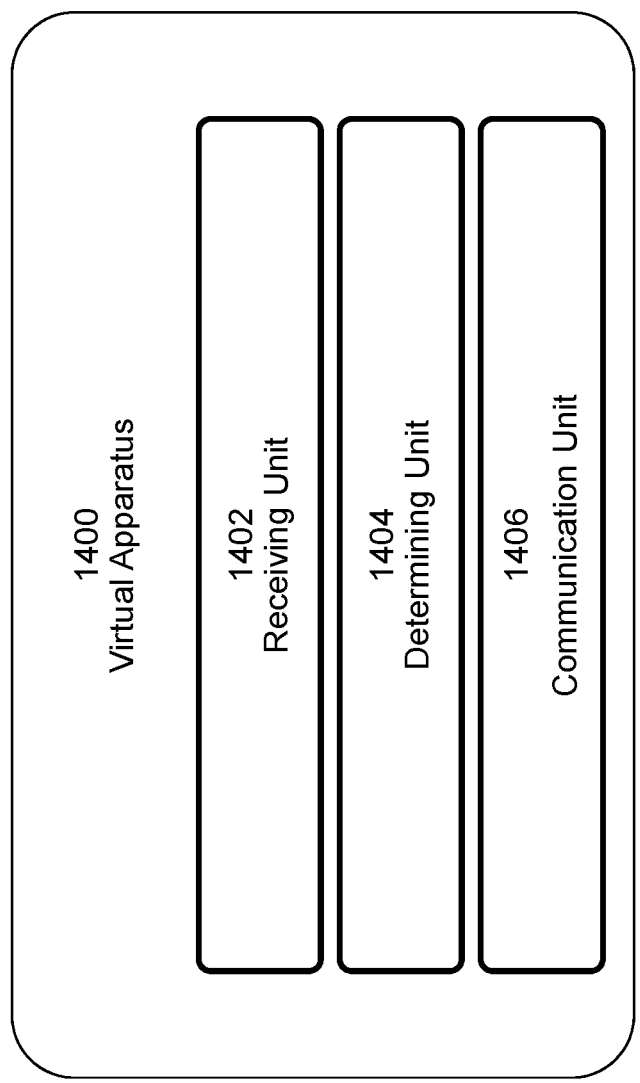
FIG. 14 is a schematic block diagram of a virtualization apparatus, in accordance with certain embodiments.

FIG. 14 is a schematic block diagram of a virtualization apparatus, in accordance with certain embodiments. More particularly, FIG. 14 illustrates a schematic block diagram of an apparatus 1400 in a wireless network (for example, the wireless network shown in FIG. 7). The apparatus may be implemented in a wireless device (e.g., wireless device 110 shown in FIG. 7). Apparatus 1400 is operable to carry out the example method described with reference to FIG. 13 above and possibly any other processes or methods disclosed herein. It is also to be understood that the method of FIG. 14 is not necessarily carried out solely by apparatus 1400. At least some operations of the method can be performed by one or more other entities.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1402, determining unit 1404, communication unit 1406, and any other suitable units of apparatus 1400 to perform corresponding functions according one or more embodiments of the present disclosure.

As illustrated in FIG. 14, apparatus 1400 includes receiving unit 1402, determining unit 1404, and communication unit 1406. Receiving unit 1402 may be configured to perform the receiving functions of apparatus 1400. For example, receiving unit 1402 may be configured to obtain a primary barring configuration for access control in a wireless communications network. As another example, receiving unit 1402 may be configured to obtain a secondary barring configuration for access control in the wireless communications network. As another example, receiving unit 1402 may be configured to obtain a plurality of primary barring configurations for a set of access categories, each of the plurality of primary barring configurations associated with one or more access categories in the set of access categories.

Receiving unit 1402 may include a receiver and/or a transceiver. Receiving unit 1402 may include a receiver and/or a transceiver, such as RF transceiver circuitry 122 described above in relation to FIG. 7. Receiving unit 1402 may include circuitry configured to wirelessly receive messages and/or signals. In particular embodiments, receiving unit 1402 may communicate received messages and/or signals to determining unit 1404. The functions of receiving unit 1404 described above may, in certain embodiments, be performed in one or more distinct units.

Determining unit 1404 may be configured to perform the processing functions of apparatus 1400. For example, determining unit 1404 may be configured to obtain a primary barring configuration for access control in a wireless communications network. Determining unit 1404 may be configured to obtain a secondary barring configuration for access control in the wireless communications network. Determining unit 1404 may be configured to determine, based on the primary barring configuration and the secondary barring configuration, whether an access attempt by the UE in the wireless communications network is barred. Determining unit 1404 may be configured to determine an access category associated with the access attempt by the UE. Determining unit 1404 may be configured to refrain from performing the access attempt in response to a determination that the access attempt by the UE in the wireless communications network is barred. Determining unit 1404 may be configured to perform the access attempt in response to a determination that the access attempt by the UE in the wireless communications is not barred.

Determining unit 1404 may be configured to determine whether the secondary barring factor indicates that the primary barring factor should be applied. Determining unit 1404 may be configured to determine that the access attempt by the UE is not barred in response to determining that the secondary barring factor indicates that the primary barring factor should not be applied. Determining unit 1404 may be configured to, in response to determining that the secondary barring factor indicates that the primary barring factor should be applied, generate a random number and compare the generated random number to the percentage value representing the probability that the access attempt by the UE will not be barred. Determining unit 1404 may be configured to determine that the access attempt is not barred when the random number is less than the percentage value representing the probability that the access attempt by the UE will not be barred. Determining unit 1404 may be configured to determine that the access attempt is barred when the random number is equal to or greater than the percentage value representing the probability that the access attempt by the UE will not be barred. Determining unit 1404 may be configured to wait for a time period equal to the primary barring time before determining whether a subsequent access attempt by the UE in the wireless communications network is barred. Determining unit 1404 may be configured to wait for a time period equal to the primary barring time before determining whether a subsequent access attempt by the UE in the wireless communications network is barred, if the secondary barring time indicates that the primary barring time should be applied.

Determining unit 1404 may be configured to combine the percentage value representing the probability that the access attempt by the UE will not be barred with the percentage offset to obtain a combined barring factor, and determine whether the access attempt by the UE in the wireless communications network is barred is based on the combined barring factor. Determining unit 1404 may be configured to applying the position offset to the first position to obtain a combined barring factor, and determine whether the access attempt by the UE in the wireless communications network is barred is based on the combined barring factor. Determining unit 1404 may be configured to generate a random number and compare the generated random number to the combined barring factor. Determining unit 1404 may be configured to determine that the access attempt is not barred when the random number is less than the combined barring factor. Determining unit 1404 may be configured to determine that the access attempt is barred when the random number is equal to or greater than the combined barring factor. Determining unit 1404 may be configured to combine the secondary barring time with the primary barring time to generate a combined barring time, and to wait for a time period equal to the combined barring time before determining whether a subsequent access attempt by the UE in the wireless communications network is barred.

Determining unit 1404 may include or be included in one or more processors, such as processing circuitry 170 described above in relation to FIG. 7. Determining unit 1404 may include analog and/or digital circuitry configured to perform any of the functions of determining unit 1404 and/or processing circuitry 120 described above. The functions of determining unit 1404 described above may, in certain embodiments, be performed in one or more distinct modules.

Communication unit 1406 may be configured to perform the transmission functions of apparatus 1400. Communication unit 1406 may include a transmitter and/or a transceiver, such as RF transceiver circuitry 122 described above in relation to FIG. 7. Communication unit 1406 may include circuitry configured to wirelessly transmit messages and/or signals. In particular embodiments, communication unit 1406 may receive messages and/or signals for transmission from determining unit 1404. In certain embodiments, the functions of communication unit 1406 described above may be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 15:
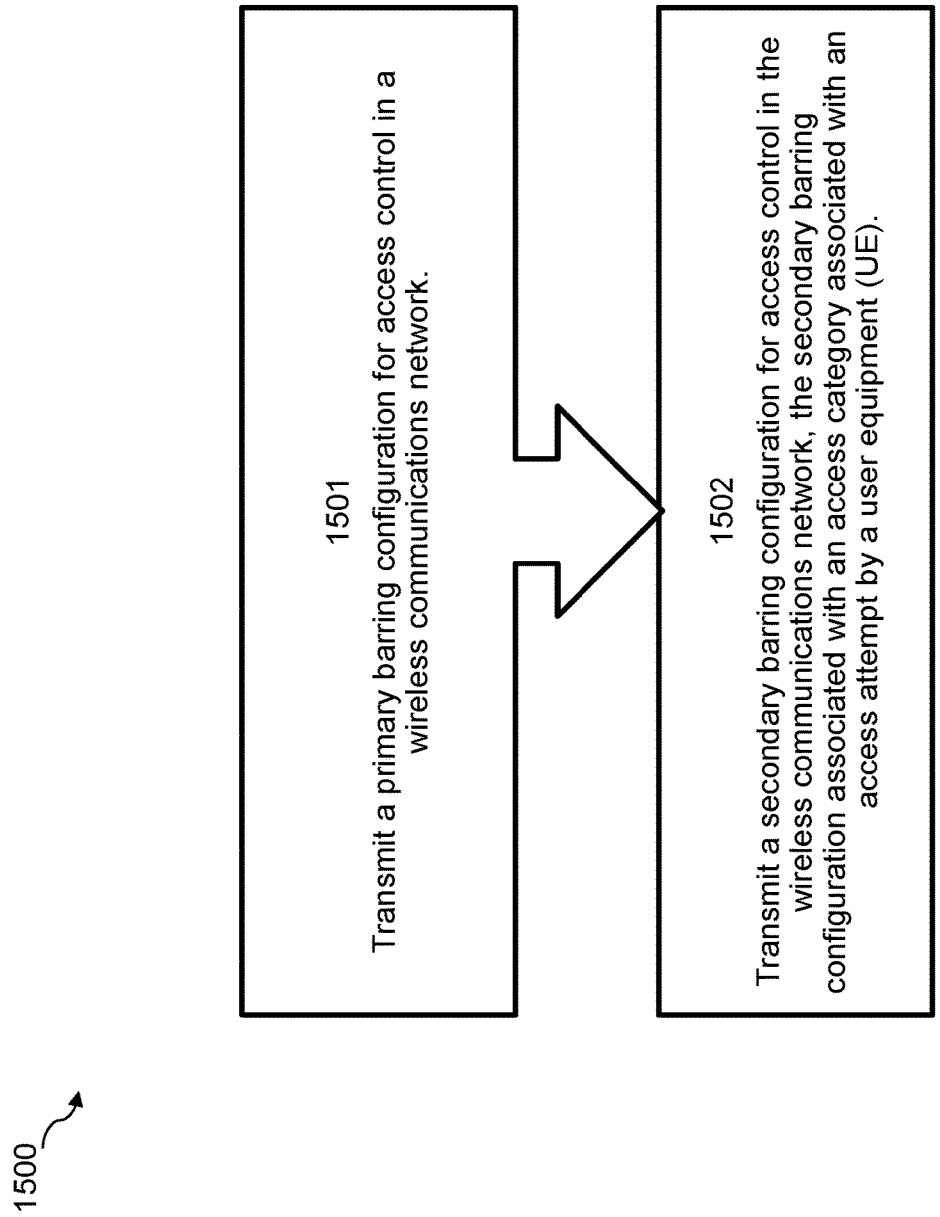
FIG. 15 is a flowchart of a method in a network node, in accordance with certain embodiments.

FIG. 15 is a flowchart of a method 1500 in a network node, in accordance with certain embodiments. Method 1500 begins at step 1501, where the network node transmits a primary barring configuration for access control in a wireless communications network. In certain embodiments, the primary barring configuration may comprise a primary barring factor and a primary barring time. In certain embodiments, the primary barring factor may comprise a percentage value representing a probability that the access attempt by the UE will not be barred. In certain embodiments, the primary barring factor may indicate a first position within a set, each position within the set associated with a percentage value representing a probability that the access attempt by the UE will not be barred.

In certain embodiments, transmitting the primary barring configuration may comprise transmitting a plurality of primary barring configurations for a set of access categories, each of the plurality of primary barring configurations associated with one or more access categories in the set of access categories. In certain embodiments, each of the plurality of primary barring configurations may be associated with a respective access category in the set of access categories. In certain embodiments, each of the plurality of primary barring configurations may be associated with multiple access categories in the set of access categories.

At step 1502, the network node transmits a secondary barring configuration for access control in the wireless communications network. The secondary barring configuration may be associated with an access category associated with an access attempt by a UE. In certain embodiments, the secondary barring configuration may comprise a secondary barring factor. In certain embodiments, the secondary barring factor may comprise an indication of whether the primary barring factor should be applied. In certain embodiments, the secondary barring factor may comprise a percentage offset. In certain embodiments, the secondary barring factor may comprise a position offset.

In certain embodiments, the secondary barring configuration may further comprise a secondary barring time. In certain embodiments, the secondary barring time may comprise an indication of whether the primary barring time should be applied.

In certain embodiments, the primary barring configuration and the secondary barring configuration may be included in system information broadcast by the network node. In certain embodiments, the primary barring configuration may be included in a first type of system information and the secondary barring configuration may be included in a second type of system information. In certain embodiments, the primary barring configuration may be transmitted with a higher repetition frequency than the secondary barring configuration.

Figure 16:
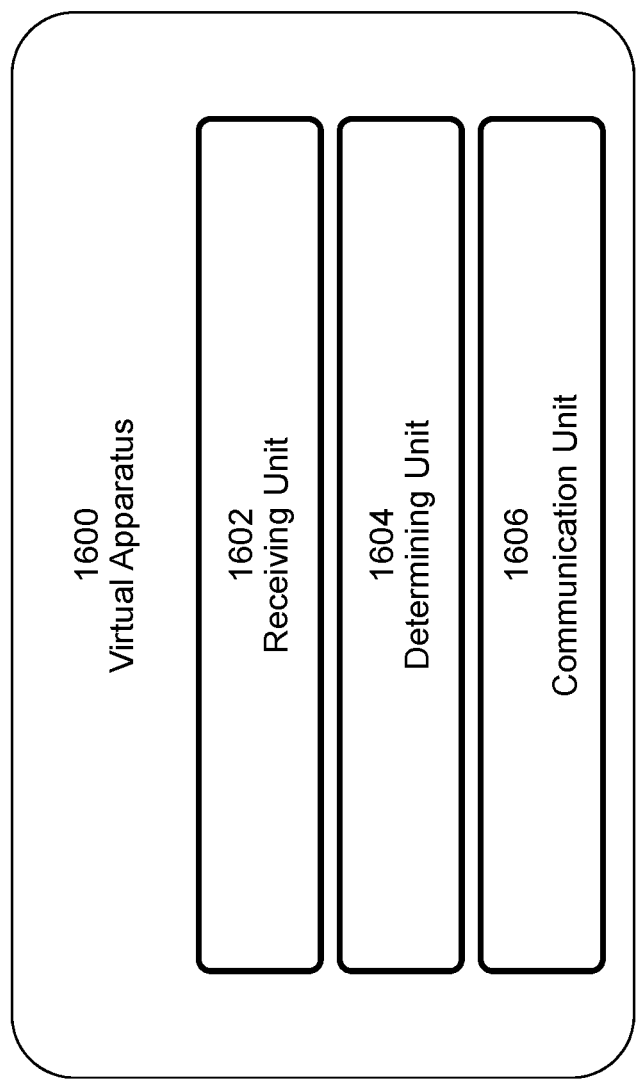
FIG. 16 is a schematic block diagram of a virtualization apparatus, in accordance with certain embodiments.

FIG. 16 is a schematic block diagram of a virtualization apparatus, in accordance with certain embodiments. More particularly, FIG. 16 illustrates a schematic block diagram of an apparatus 1600 in a wireless network (for example, the wireless network shown in FIG. 7). The apparatus may be implemented in a network node (e.g., network node 160 shown in FIG. 7). Apparatus 1600 is operable to carry out the example method described with reference to FIG. 15 above and possibly any other processes or methods disclosed herein. It is also to be understood that the method of FIG. 15 is not necessarily carried out solely by apparatus 1600. At least some operations of the method can be performed by one or more other entities.

Virtual Apparatus 1600 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1602, determining unit 1604, communication unit 1606, and any other suitable units of apparatus 1600 to perform corresponding functions according one or more embodiments of the present disclosure.

As illustrated in FIG. 16, apparatus 1600 includes receiving unit 1602, determining unit 1604, and communication unit 1606. Receiving unit 1602 may be configured to perform the receiving functions of apparatus 1600.

Receiving unit 1602 may receive any suitable information from a wireless device. Receiving unit 1602 may include a receiver and/or a transceiver, such as RF transceiver circuitry 172 described above in relation to FIG. 7. Receiving unit 1602 may include circuitry configured to wirelessly receive messages and/or signals. In particular embodiments, receiving unit 1602 may communicate received messages and/or signals to determining unit 1604 or any other suitable unit of apparatus 1600. The functions of receiving unit 1604 may, in certain embodiments, be performed in one or more distinct units.

Determining unit 1604 may perform the processing functions of apparatus 1600. Determining unit 1604 may include or be included in one or more processors, such as processing circuitry 170 described above in relation to FIG. 7. Determining unit 1604 may include analog and/or digital circuitry configured to perform any of the functions of determining unit 1604 and/or processing circuitry 170 described above. The functions of determining unit 1604 may, in certain embodiments, be performed in one or more distinct units.

Communication unit 1606 may be configured to perform the transmission functions of apparatus 1600. For example, communication unit 1606 may be configured to transmit a primary barring configuration for access control in a wireless communications network. As another example, communication unit 1606 may be configured to transmit a secondary barring configuration for access control in the wireless communications network, the secondary barring configuration associated with an access category associated with an access attempt by a UE. As still another example, communication unit 1606 may be configured to transmit a plurality of primary barring configurations for a set of access categories, each of the plurality of primary barring configurations associated with one or more access categories in the set of access categories. As yet another example, communication unit 1606 may be configured to transmit the primary barring configuration with a higher repetition frequency than the secondary barring configuration.

Communication unit 1606 may transmit messages to one or more of wireless devices 810. Communication unit 1606 may include a transmitter and/or a transceiver, such as RF transceiver circuitry 172 described above in relation to FIG. 7. Communication unit 1606 may include circuitry configured to wirelessly transmit messages and/or signals. In particular embodiments, communication unit 1606 may receive messages and/or signals for transmission from determining unit 1604 or any other unit of apparatus 1600. The functions of communication unit 1604 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 17:
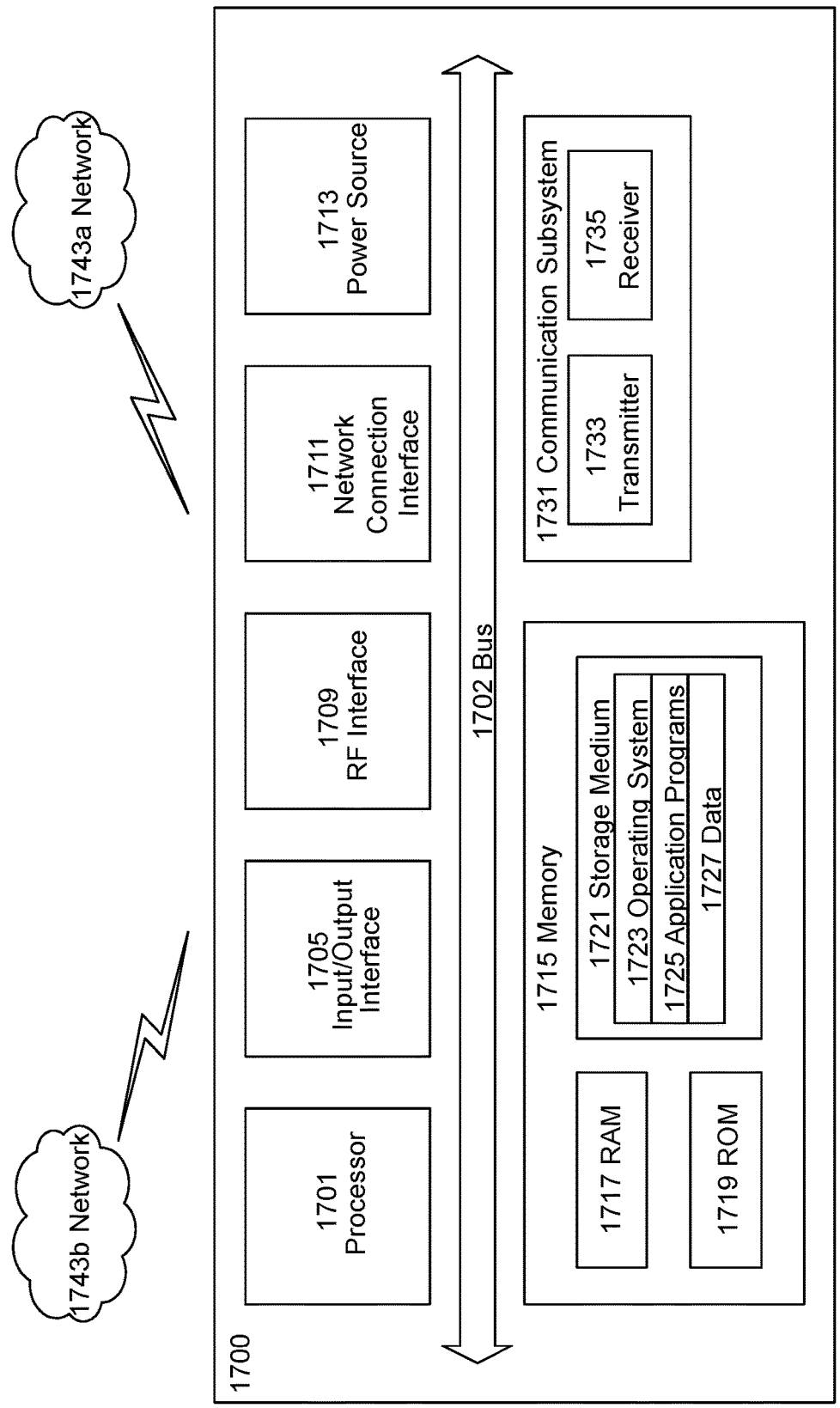
FIG. 17 illustrates one embodiment of a UE, in accordance with certain embodiments.

FIG. 17 illustrates one embodiment of a UE, in accordance with certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the $3^{rd}$ Generation Partnership Project (3GPP), including a NB-IoT UE that is not intended for sale to, or operation by, a human user. UE 1700, as illustrated in FIG. 17, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1713, and/or any other component, or any combination thereof. Storage medium 1721 includes operating system 1723, application program 1725, and data 1727. In other embodiments, storage medium 1721 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 1701 may be configured to process computer instructions and data. Processing circuitry 1701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 may include two central processing units (CPUs). Data may be information in a form suitable for use by a computer.

In the depicted embodiment, input/output interface 1705 may be configured to provide a communication interface to an input device, output device, or input and output device. UE 1700 may be configured to use an output device via input/output interface 1705. An output device may use the same type of interface port as an input device. For example, a USB port may be used to provide input to and output from UE 1700. The output device may be a speaker, a sound card, a video card, a display, a monitor, a printer, an actuator, an emitter, a smartcard, another output device, or any combination thereof. UE 1700 may be configured to use an input device via input/output interface 1705 to allow a user to capture information into UE 1700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 1709 may be configured to provide a communication interface to RF components such as a transmitter, a receiver, and an antenna. Network connection interface 1711 may be configured to provide a communication interface to network 1743*a*. Network 1743*a* may encompass wired and/or wireless networks such as a local-area network (LAN), a wide-area network (WAN), a computer network, a wireless network, a telecommunications network, another like network or any combination thereof. For example, network 1743*a* may comprise a Wi-Fi network. Network connection interface 1711 may be configured to include a receiver and a transmitter interface used to communicate with one or more other devices over a communication network according to one or more communication protocols, such as Ethernet, TCP/IP, SONET, ATM, or the like. Network connection interface 1711 may implement receiver and transmitter functionality appropriate to the communication network links (e.g., optical, electrical, and the like). The transmitter and receiver functions may share circuit components, software or firmware, or alternatively may be implemented separately.

RAM 1717 may be configured to interface via bus 1702 to processing circuitry 1701 to provide storage or caching of data or computer instructions during the execution of software programs such as the operating system, application programs, and device drivers. ROM 1719 may be configured to provide computer instructions or data to processing circuitry 1701. For example, ROM 1719 may be configured to store invariant low-level system code or data for basic system functions such as basic input and output (I/O), startup, or reception of keystrokes from a keyboard that are stored in a non-volatile memory. Storage medium 1721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1721 may be configured to include operating system 1723, application program 1725 such as a web browser application, a widget or gadget engine or another application, and data file 1727. Storage medium 1721 may store, for use by UE 1700, any of a variety of various operating systems or combinations of operating systems.

Storage medium 1721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 may allow UE 1700 to access computer-executable instructions, application programs or the like, stored on transitory or non-transitory memory media, to off-load data, or to upload data. An article of manufacture, such as one utilizing a communication system may be tangibly embodied in storage medium 1721, which may comprise a device readable medium.

In FIG. 17, processing circuitry 1701 may be configured to communicate with network 1743*b* using communication subsystem 1731. Network 1743*a* and network 1743*b* may be the same network or networks or different network or networks. Communication subsystem 1731 may be configured to include one or more transceivers used to communicate with network 1743*b*. For example, communication subsystem 1731 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter 1733 and/or receiver 1735 to implement transmitter or receiver functionality, respectively, appropriate to the RAN links (e.g., frequency allocations and the like). Further, transmitter 1733 and receiver 1735 of each transceiver may share circuit components, software or firmware, or alternatively may be implemented separately.

In the illustrated embodiment, the communication functions of communication subsystem 1731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 may include cellular communication, Wi-Fi communication, Bluetooth communication, and GPS communication. Network 1743*b* may encompass wired and/or wireless networks such as a local-area network (LAN), a wide-area network (WAN), a computer network, a wireless network, a telecommunications network, another like network or any combination thereof. For example, network 1743*b* may be a cellular network, a Wi-Fi network, and/or a near-field network. Power source QQ213 may be configured to provide alternating current (AC) or direct current (DC) power to components of UE 1700.

The features, benefits and/or functions described herein may be implemented in one of the components of UE 1700 or partitioned across multiple components of UE 1700. Further, the features, benefits, and/or functions described herein may be implemented in any combination of hardware, software or firmware. In one example, communication subsystem 1731 may be configured to include any of the components described herein. Further, processing circuitry 1701 may be configured to communicate with any of such components over bus 1702. In another example, any of such components may be represented by program instructions stored in memory that when executed by processing circuitry 1701 perform the corresponding functions described herein. In another example, the functionality of any of such components may be partitioned between processing circuitry 1701 and communication subsystem 1731. In another example, the non-computationally intensive functions of any of such components may be implemented in software or firmware and the computationally intensive functions may be implemented in hardware.

Figure 18:
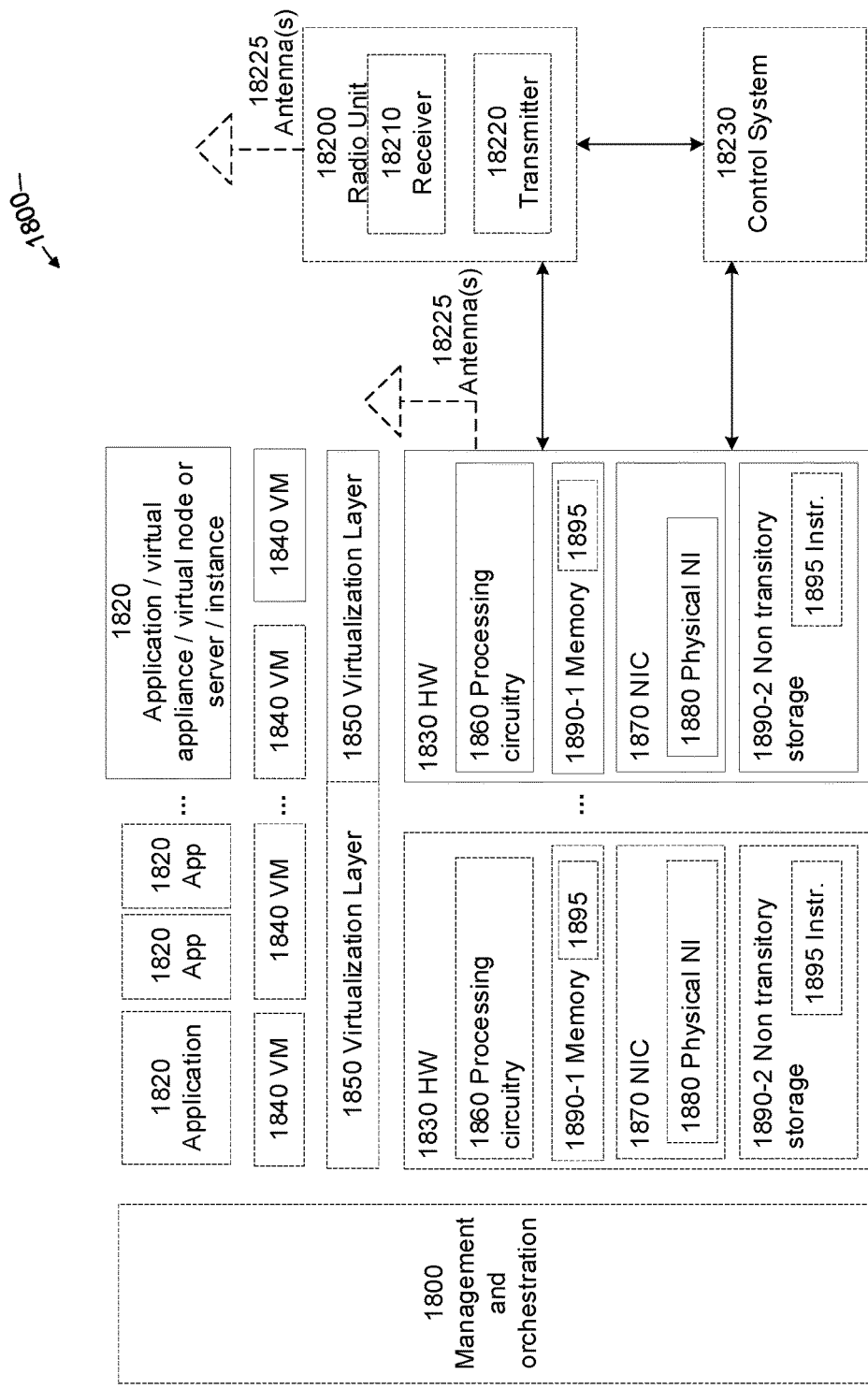
FIG. 18 is a schematic block diagram illustrating a virtualization environment, in accordance with certain embodiments.

FIG. 18 is a schematic block diagram illustrating a virtualization environment, in accordance with certain embodiments. More particularly, FIG. 18 is a schematic block diagram illustrating a virtualization environment 1800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node may be entirely virtualized.

The functions may be implemented by one or more applications 1820 (which may alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which may be commercial off-the-shelf (COTS) processors, dedicated Application Specific Integrated Circuits (ASICs), or any other type of processing circuitry including digital or analog hardware components or special purpose processors. Each hardware device may comprise memory 1890-1 which may be non-persistent memory for temporarily storing instructions 1895 or software executed by processing circuitry 1860. Each hardware device may comprise one or more network interface controllers (NICs) 1870, also known as network interface cards, which include physical network interface 1880. Each hardware device may also include non-transitory, persistent, machine-readable storage media 1890-2 having stored therein software 1895 and/or instructions executable by processing circuitry 1860. Software 1895 may include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and may be run by a corresponding virtualization layer 1850 or hypervisor. Different embodiments of the instance of virtual appliance 1820 may be implemented on one or more of virtual machines 1840, and the implementations may be made in different ways.

During operation, processing circuitry 1860 executes software 1895 to instantiate the hypervisor or virtualization layer 1850, which may sometimes be referred to as a virtual machine monitor (VMM). Virtualization layer 1850 may present a virtual operating platform that appears like networking hardware to virtual machine 1840.

As shown in FIG. 18, hardware 1830 may be a standalone network node with generic or specific components. Hardware 1830 may comprise antenna 18225 and may implement some functions via virtualization. Alternatively, hardware 1830 may be part of a larger cluster of hardware (e.g. such as in a data center or customer premise equipment (CPE)) where many hardware nodes work together and are managed via management and orchestration (MANO) 18100, which, among others, oversees lifecycle management of applications 1820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1840 may be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 18.

In some embodiments, one or more radio units 18200 that each include one or more transmitters 18220 and one or more receivers 18210 may be coupled to one or more antennas 18225. Radio units 18200 may communicate directly with hardware nodes 1830 via one or more appropriate network interfaces and may be used in combination with the virtual components to provide a virtual node with radio capabilities, such as a radio access node or a base station.

In some embodiments, some signalling can be effected with the use of control system 18230 which may alternatively be used for communication between the hardware nodes 1830 and radio units 18200.

Figure 19:
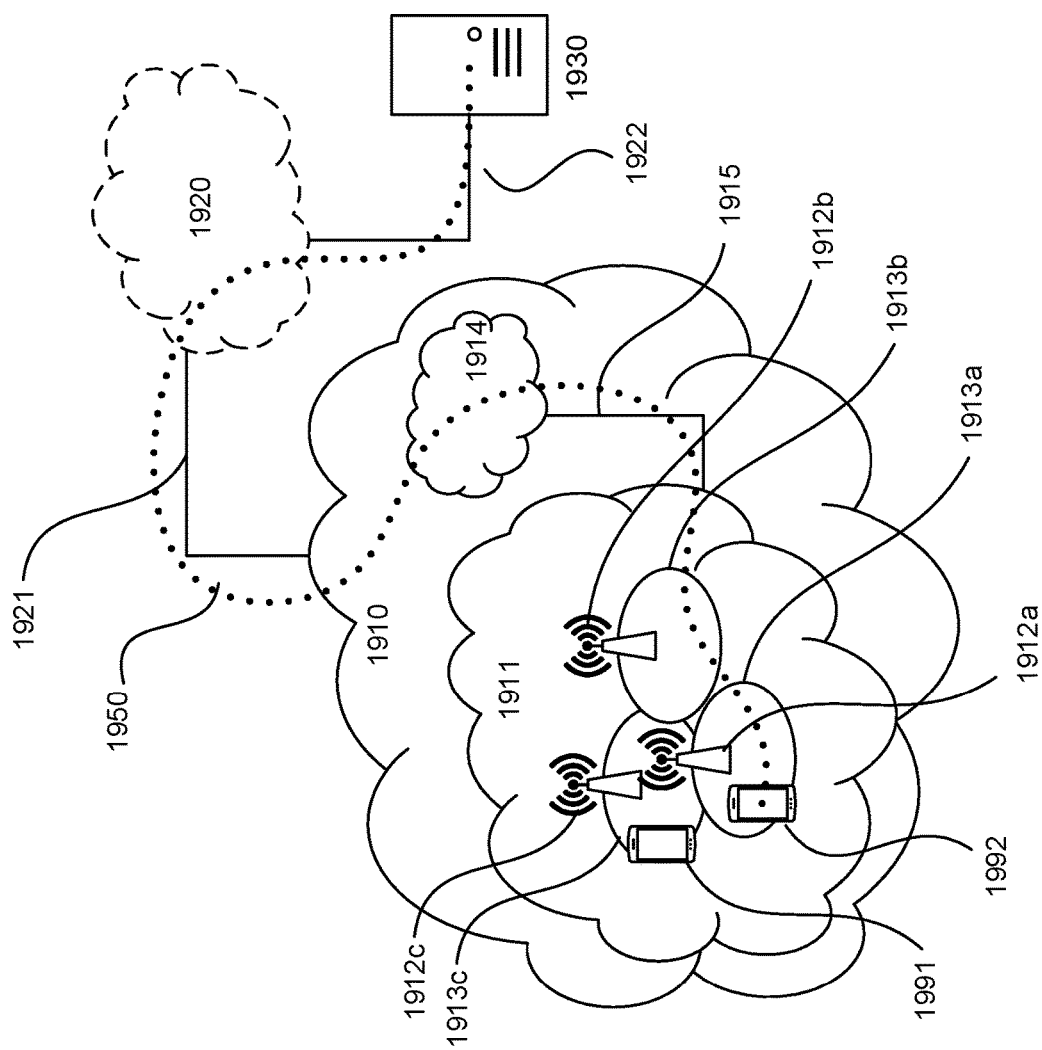
FIG. 19 illustrates an example telecommunication network connected via an intermediate network to a host computer, in accordance with certain embodiments.

FIG. 19 illustrates an example telecommunication network connected via an intermediate network to a host computer, in accordance with certain embodiments. With reference to FIG. 19, in accordance with an embodiment, a communication system includes telecommunication network 1910, such as a 3GPP-type cellular network, which comprises access network 1911, such as a radio access network, and core network 1914. Access network 1911 comprises a plurality of base stations 1912*a*, 1912*b*, 1912*c*, such as NBs, eNBs, gNBs or other types of wireless access points, each defining a corresponding coverage area 1913*a*, 1913*b*, 1913*c*. Each base station 1912*a*, 1912*b*, 1912*c* is connectable to core network 1914 over a wired or wireless connection 1915. A first UE 1991 located in coverage area 1913*c* is configured to wirelessly connect to, or be paged by, the corresponding base station 1912*c*. A second UE 1992 in coverage area 1913*a* is wirelessly connectable to the corresponding base station 1912*a*. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which may be embodied in the hardware and/or software of a standalone server, a cloud-implemented server, a distributed server or as processing resources in a server farm. Host computer 1930 may be under the ownership or control of a service provider, or may be operated by the service provider or on behalf of the service provider. Connections 1921 and 1922 between telecommunication network 1910 and host computer 1930 may extend directly from core network 1914 to host computer 1930 or may go via an optional intermediate network 1920. Intermediate network 1920 may be one of, or a combination of more than one of, a public, private or hosted network; intermediate network 1920, if any, may be a backbone network or the Internet; in particular, intermediate network 1920 may comprise two or more sub-networks (not shown).

The communication system of FIG. 19 as a whole enables connectivity between the connected UEs 1991, 1992 and host computer 1930. The connectivity may be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 may be transparent in the sense that the participating communication devices through which OTT connection 1950 passes are unaware of routing of UL and DL communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing UL communication originating from the UE 1991 towards the host computer 1930.

Figure 20:
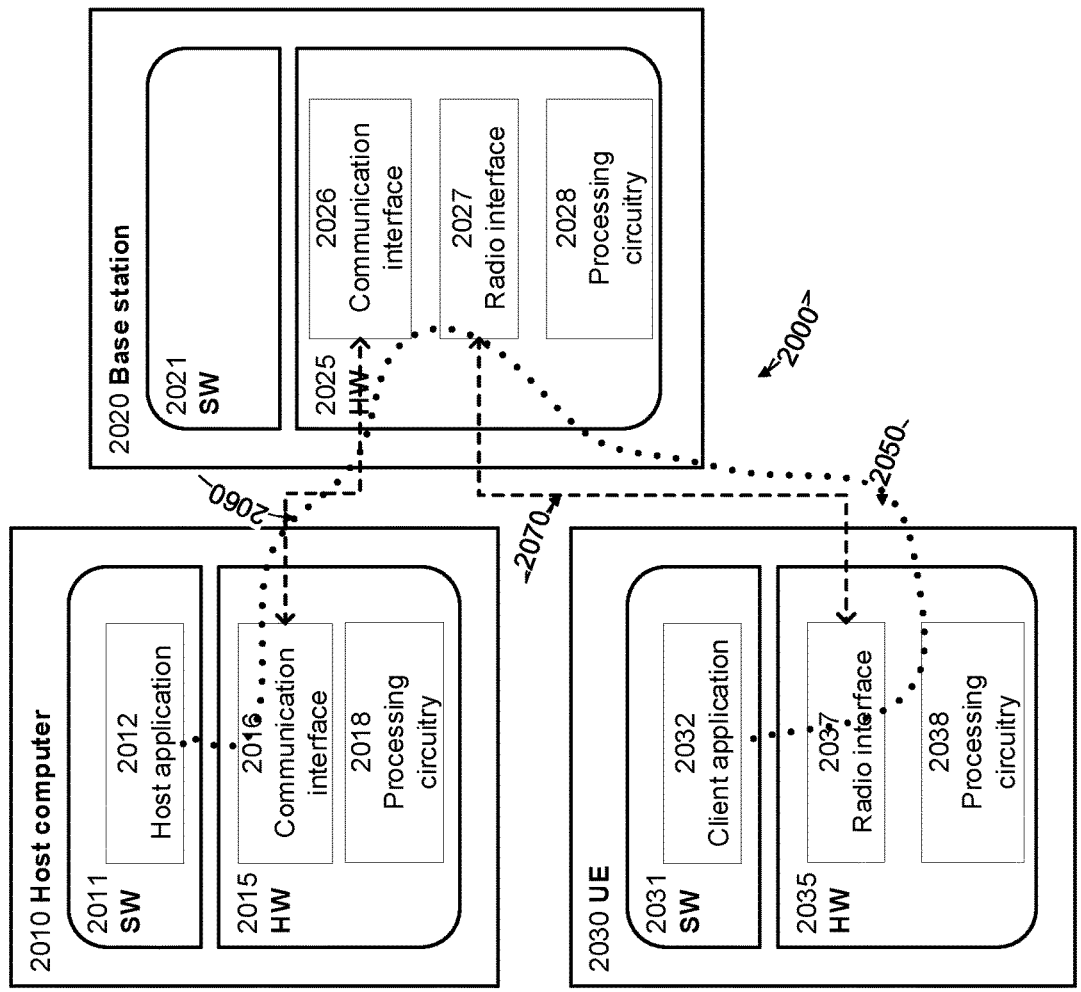
FIG. 20 illustrates an example of a host computer communicating via a base station with a UE over a partially wireless connection, in accordance with certain embodiments.

FIG. 20 illustrates an example of a host computer communicating via a base station with a UE over a partially wireless connection, in accordance with certain embodiments. Example implementations, in accordance with an embodiment, of the UE, base station and host computer discussed in the preceding paragraphs will now be described with reference to FIG. 20. In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which may have storage and/or processing capabilities. In particular, processing circuitry 2018 may comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 may be operable to provide a service to a remote user, such as UE 2030 connecting via OTT connection 2050 terminating at UE 2030 and host computer 2010. In providing the service to the remote user, host application 2012 may provide user data which is transmitted using OTT connection 2050.

Communication system 2000 further includes base station 2020 provided in a telecommunication system and comprising hardware 2025 enabling it to communicate with host computer 2010 and with UE 2030. Hardware 2025 may include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 20) served by base station 2020. Communication interface 2026 may be configured to facilitate connection 2060 to host computer 2010. Connection 2060 may be direct or it may pass through a core network (not explicitly shown in FIG. 20) of the telecommunication system and/or through one or more intermediate networks outside the telecommunication system. In the embodiment shown, hardware 2025 of base station 2020 further includes processing circuitry 2028, which may comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 further includes UE 2030 already referred to. Its hardware 2035 may include radio interface 2037 configured to set up and maintain wireless connection 2070 with a base station serving a coverage area in which UE 2030 is currently located. Hardware 2035 of UE 2030 further includes processing circuitry 2038, which may comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 may be operable to provide a service to a human or non-human user via UE 2030, with the support of host computer 2010. In host computer 2010, an executing host application 2012 may communicate with the executing client application 2032 via OTT connection 2050 terminating at UE 2030 and host computer 2010. In providing the service to the user, client application 2032 may receive request data from host application 2012 and provide user data in response to the request data. OTT connection 2050 may transfer both the request data and the user data. Client application 2032 may interact with the user to generate the user data that it provides.

It is noted that host computer 2010, base station 2020 and UE 2030 illustrated in FIG. 20 may be similar or identical to host computer 1930, one of base stations 1912*a*, 1912*b*, 1912*c* and one of UEs 1991, 1992 of FIG. 19, respectively. This is to say, the inner workings of these entities may be as shown in FIG. 20 and independently, the surrounding network topology may be that of FIG. 19.

In FIG. 20, OTT connection 2050 has been drawn abstractly to illustrate the communication between host computer 2010 and UE 2030 via base station 2020, without explicit reference to any intermediary devices and the precise routing of messages via these devices. Network infrastructure may determine the routing, which it may be configured to hide from UE 2030 or from the service provider operating host computer 2010, or both. While OTT connection 2050 is active, the network infrastructure may further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment. More precisely, the teachings of these embodiments may improve the power consumption and thereby provide benefits such as extended battery lifetime and reduced user waiting time.

A measurement procedure may be provided for the purpose of monitoring data rate, latency and other factors on which the one or more embodiments improve. There may further be an optional network functionality for reconfiguring OTT connection 2050 between host computer 2010 and UE 2030, in response to variations in the measurement results. The measurement procedure and/or the network functionality for reconfiguring OTT connection 2050 may be implemented in software 2011 and hardware 2015 of host computer 2010 or in software 2031 and hardware 2035 of UE 2030, or both. In embodiments, sensors (not shown) may be deployed in or in association with communication devices through which OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of OTT connection 2050 may include message format, retransmission settings, preferred routing etc.; the reconfiguring need not affect base station 2020, and it may be unknown or imperceptible to base station 2020. Such procedures and functionalities may be known and practiced in the art. In certain embodiments, measurements may involve proprietary UE signaling facilitating host computer 2010's measurements of throughput, propagation times, latency and the like. The measurements may be implemented in that software 2011 and 2031 causes messages to be transmitted, in particular empty or 'dummy' messages, using OTT connection 2050 while it monitors propagation times, errors etc.

Figure 21:
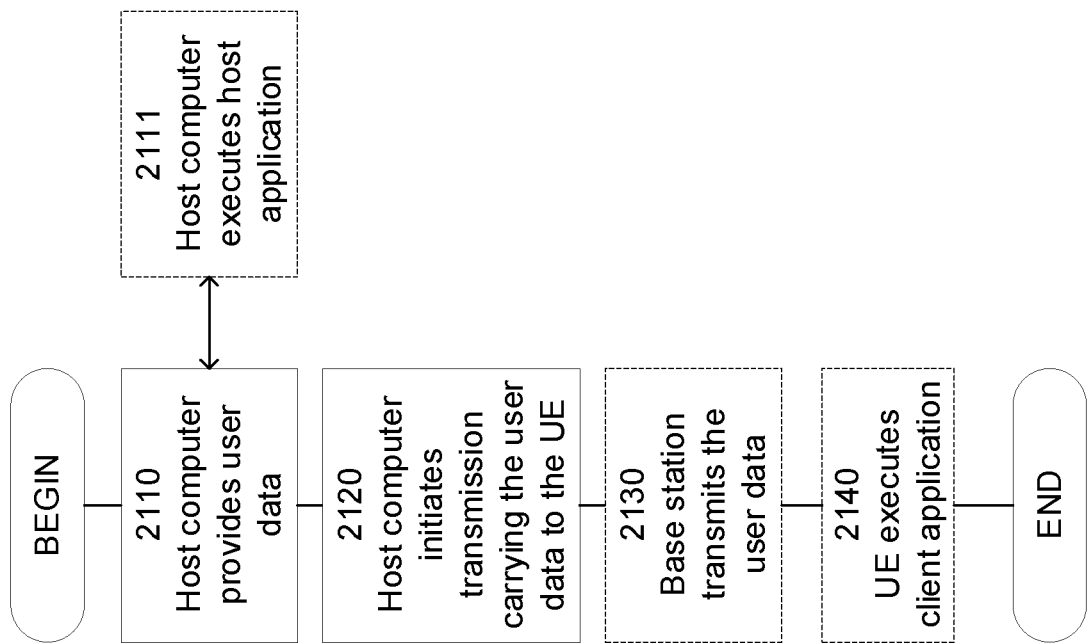
FIG. 21 is a flowchart of a method implemented in a communication system, in accordance with certain embodiments.

FIG. 21 is a flowchart of a method implemented in a communication system, in accordance with certain embodiments. The communication system includes a host computer, a base station and a UE which may be those described with reference to FIGS. 19 and 20. For simplicity of the present disclosure, only drawing references to FIG. 21 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described throughout this disclosure. In step 2140 (which may also be optional), the UE executes a client application associated with the host application executed by the host computer.

Figure 22:
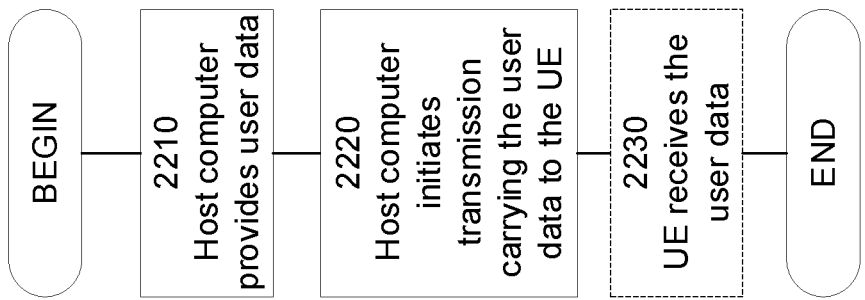
FIG. 22 is a flowchart of a method implemented in a communication system, in accordance with certain embodiments.

FIG. 22 is a flowchart of a method implemented in a communication system, in accordance with certain embodiments. The communication system includes a host computer, a base station and a UE which may be those described with reference to FIGS. 19 and 20. For simplicity of the present disclosure, only drawing references to FIG. 22 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described throughout this disclosure. In step 2230 (which may be optional), the UE receives the user data carried in the transmission.

Figures 23, 24:
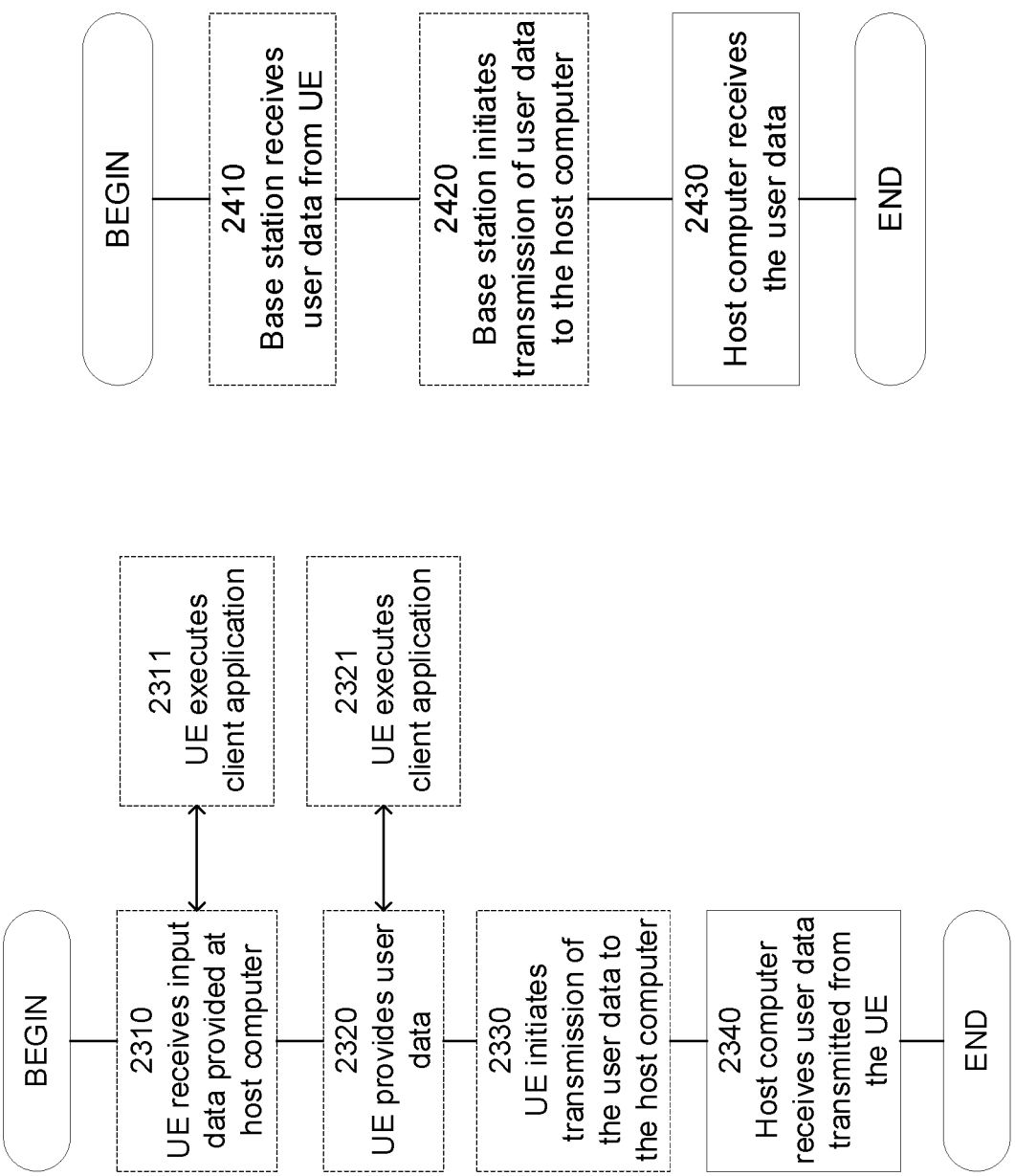
FIG. 23 is a flowchart of a method implemented in a communication system, in accordance with certain embodiments.
FIG. 24 is a flowchart of a method implemented in a communication system, in accordance with certain embodiments.

FIG. 23 is a flowchart of a method implemented in a communication system, in accordance with certain embodiments. The communication system includes a host computer, a base station and a UE which may be those described with reference to FIGS. 19 and 20. For simplicity of the present disclosure, only drawing references to FIG. 23 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in substep 2330 (which may be optional), transmission of the user data to the host computer. In step 2340 of the method, the host computer receives the user data transmitted from the UE, in accordance with the teachings of the embodiments described throughout this disclosure.

FIG. 24 is a flowchart of a method implemented in a communication system, in accordance with certain embodiments. The communication system includes a host computer, a base station and a UE which may be those described with reference to FIGS. 19 and 20. For simplicity of the present disclosure, only drawing references to FIG. 24 will be included in this section. In step 2410 (which may be optional), in accordance with the teachings of the embodiments described throughout this disclosure, the base station receives user data from the UE. In step 2420 (which may be optional), the base station initiates transmission of the received user data to the host computer. In step 2430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

At least some of the following abbreviations may be used in this disclosure. If there is an inconsistency between abbreviations, preference should be given to how it is used above. If listed multiple times below, the first listing should be preferred over any subsequent listing(s).

1× RTT CDMA2000 1× Radio Transmission Technology
3GPP 3rd Generation Partnership Project
5G 5th Generation
5GC 5G Core
5GS 5G System
ABS Almost Blank Subframe
AC Access Class
ACB Access Class Barring
ACDC Application specific Congestion control for Data Communication
AN Access Network or Access Node
ARQ Automatic Repeat Request
AS Access Stratum
ASN.1 Abstract Syntax Notation 1
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSFB Circuit-Switched Fallback
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
EAB Extended Access Barring
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
EPC Evolved Packet Core
EPS Evolved Packet System
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR (corresponding to eNB in LTE)
GNSS Global Navigation Satellite System
GSM Global System for Mobile communication
HARQ Hybrid Automatic Repeat Request
HO Handover
HSPA High Speed Packet Access
HRPD High Rate Packet Data
IoT Internet-of-Things
IMS IP Multi-Media Subsystem
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MMTel Multi-Media Telephony
MSC Mobile Switching Center
NAS Non-Access Stratum
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OMA-DM Open Mobile Alliance Device Management
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
QoS Quality of Service
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSAC Service Specific Access Control
SSS Secondary Synchronization Signal
TDD Time Division Duplex
TDOA Time Difference of Arrival
TOA Time of Arrival
TSS Tertiary Synchronization Signal
TTI Transmission Time Interval
UAC Unified Access Control
UE User Equipment
UL Uplink
UMTS Universal Mobile Telecommunication System
U.S.S. Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method in a user equipment (UE), comprising:
obtaining a primary barring configuration for access control in a wireless communications network;
obtaining a secondary barring configuration for access control in the wireless communications network; and
determining, based on the primary barring configuration and the secondary barring configuration, whether an access attempt by the UE in the wireless communications network is barred, wherein:
the primary barring configuration comprises a primary barring factor,
the primary barring factor comprises a percentage value representing a probability that the access attempt by the UE will not be barred,
the secondary barring configuration comprises a secondary barring factor,
the secondary barring factor comprises an indication of whether the primary barring factor should be applied, and
determining whether the access attempt by the UE in the wireless communications network in barred comprises determining whether the secondary barring factor indicates that the primary barring factor should be applied.

2. A method in a network node, comprising:
transmitting a primary barring configuration for access control in a wireless communications network; and
transmitting a secondary barring configuration for access control in the wireless communications network, the secondary barring configuration associated with an access category associated with an access attempt by a user equipment (UE);
receiving, from the UE, an indication indicating whether the access attempt by the UE is barred, wherein:
the primary barring configuration comprises a primary barring factor,
the primary barring factor comprises a percentage value representing a probability that the access attempt by the UE will not be barred,
the secondary barring configuration comprises a secondary barring factor,
the secondary barring factor comprises an indication of whether the primary barring factor should be applied, and
the indication further indicates whether the secondary barring factor indicates that the primary barring factor should be applied.

3. A user equipment (UE), comprising:
a receiver;
a transmitter; and
processing circuitry coupled to the receiver and the transmitter, the processing circuitry configured to:
obtain a primary barring configuration for access control in a wireless communications network;
obtain a secondary barring configuration for access control in the wireless communications network; and
determine, based on the primary barring configuration and the secondary barring configuration, whether an access attempt by the UE in the wireless communications network is barred, wherein:
the primary barring configuration comprises a primary barring factor,
the primary barring factor comprises a percentage value representing a probability that the access attempt by the UE will not be barred,
the secondary barring configuration comprises a secondary barring factor,
the secondary barring factor comprises an indication of whether the primary barring factor should be applied, and
determining whether the access attempt by the UE in the wireless communications network in barred comprises determining whether the secondary barring factor indicates that the primary barring factor should be applied.

4. The UE of claim 3, wherein the processing circuitry is further configured to determine an access category associated with the access attempt by the UE.

5. The UE of claim 4, wherein the secondary barring configuration is associated with the determined access category.

6. The UE of claim 3, wherein the processing circuitry is further configured to:
in response to a determination that the access attempt by the UE in the wireless communications network is barred, refrain from performing the access attempt.

7. The UE of claim 3, wherein the processing circuitry is further configured to:
in response to a determination that the access attempt by the UE in the wireless communications network is not barred, perform the access attempt.

8. The UE of claim 3, wherein the primary barring configuration further comprises:
a primary barring time.

9. The UE of claim 8, wherein the processing circuitry is further configured to:
wait for a time period equal to the primary barring time before determining whether a subsequent access attempt by the UE in the wireless communications network is barred.

10. The UE of claim 8, wherein the processing circuitry is further configured to:
if the secondary barring time indicates that the primary barring time should be applied, wait for a time period equal to the primary barring time before determining whether a subsequent access attempt by the UE in the wireless communications network is barred.

11. The UE of claim 3, wherein the processing circuitry is further configured to:
in response to determining that the secondary barring factor indicates that the primary barring factor should not be applied, determine that the access attempt by the UE is not barred.

12. The UE of claim 3, wherein the processing circuitry is further configured to:
in response to determining that the secondary barring factor indicates that the primary barring factor should be applied:
generate a random number; and
compare the generated random number to the percentage value representing the probability that the access attempt by the UE will not be barred.

13. The UE of claim 12, wherein the processing circuitry is further configured to:
determine that the access attempt is not barred when the random number is less than the percentage value representing the probability that the access attempt by the UE will not be barred.

14. The UE of claim 12, wherein the processing circuitry is further configured to:
determine that the access attempt is barred when the random number is equal to or greater than the percentage value representing the probability that the access attempt by the UE will not be barred.

15. The UE of claim 3, wherein the secondary barring configuration comprises a secondary barring time.

16. The UE of claim 3, wherein:
the primary barring factor comprises a percentage value representing a probability that the access attempt by the UE will not be barred;
the secondary barring factor comprises a percentage offset; and
the processing circuitry is further configured to:
combine the percentage value representing the probability that the access attempt by the UE will not be barred with the percentage offset to obtain a combined barring factor, wherein the processing circuitry is configured to determine whether the access attempt by the UE in the wireless communications network is barred based on the combined barring factor.

17. The UE of claim 16, wherein the processing circuitry configured to determine whether the access attempt by the UE in the wireless communications network is barred comprises processing circuitry configured to:
generate a random number; and
compare the generated random number to the combined barring factor.

18. The UE of claim 17, wherein the processing circuitry is further configured to:
determine that the access attempt is not barred when the random number is less than the combined barring factor.

19. The UE of claim 17, wherein the processing circuitry is further configured to:
determine that the access attempt is barred when the random number is equal to or greater than the combined barring factor.

20. The UE of claim 3, wherein:
the primary barring factor indicates a first position within a set, each position within the set associated with a percentage value representing a probability that the access attempt by the UE will not be barred;
the secondary barring factor comprises a position offset; and
the processing circuitry is further configured to apply the position offset to the first position to obtain a combined barring factor, wherein the processing circuitry is further configured to determine whether the access attempt by the UE in the wireless communications network is barred based on the combined barring factor.

21. The UE of claim 3, wherein the processing circuitry configured to obtain the primary barring configuration comprises processing circuitry configured to:
obtain a plurality of primary barring configurations for a set of access categories, each of the plurality of primary barring configurations associated with one or more access categories in the set of access categories.

22. The UE of claim 21, wherein each of the plurality of primary barring configurations is associated with a respective access category in the set of access categories.

23. The UE of claim 21, wherein each of the plurality of primary barring configurations is associated with multiple access categories in the set of access categories.

24. A network node, comprising:
a receiver;
a transmitter; and
processing circuitry coupled to the receiver and the transmitter, the processing circuitry configured to:
transmit, via the transmitter, a primary barring configuration for access control in a wireless communications network; and
transmit, via the transmitter, a secondary barring configuration for access control in the wireless communications network, the secondary barring configuration associated with an access category associated with an access attempt by a user equipment (UE);
receive, from the UE, an indication indicating whether the access attempt by the UE is barred, wherein:
the primary barring configuration comprises a primary barring factor,
the primary barring factor comprises a percentage value representing a probability that the access attempt by the UE will not be barred, the secondary barring configuration comprises a secondary barring factor, the secondary barring factor comprises an indication of whether the primary barring factor should be applied, and the indication further indicates whether the secondary barring factor indicates that the primary barring factor should be applied.

\* \* \* \* \*